(12) United States Patent
Van Laanen et al.

(10) Patent No.: US 8,390,214 B2
(45) Date of Patent: Mar. 5, 2013

(54) LED-BASED LIGHTING POWER SUPPLIES WITH POWER FACTOR CORRECTION AND DIMMING CONTROL

(75) Inventors: Peter Van Laanen, Boulder, CO (US); Howard Vincent Derby, Boulder, CO (US)

(73) Assignee: Albeo Technologies, Inc., Boulder, CO (US)

( * ) Notice: Subject to any disclaimer, the term of this patent is extended or adjusted under 35 U.S.C. 154(b) by 224 days.

(21) Appl. No.: 12/859,717

(22) Filed: Aug. 19, 2010

(65) Prior Publication Data
US 2011/0043133 A1 Feb. 24, 2011

Related U.S. Application Data

(60) Provisional application No. 61/235,101, filed on Aug. 19, 2009.

(51) Int. Cl.
*H05B 37/02* (2006.01)
(52) U.S. Cl. ........................ 315/294; 315/297
(58) Field of Classification Search .................. 315/294, 315/297, 299, 185 R, 307, 308, 192
See application file for complete search history.

(56) References Cited

U.S. PATENT DOCUMENTS 8,279,144 B2 * 10/2012 Zhao et al. ...................... 345/82
2010/0308733 A1 * 12/2010 Shao ............................ 315/119

OTHER PUBLICATIONS

ON Semiconductor, NCP1601A, NCP1601B—Compact Fixed Frequency Discontinuous or Critical Conduction Voltage Mode Power Factor Correction Controller; Nov. 2004, 18 pages.
Marvell Semiconductor, Inc., 88EM8011, Power Factor Correction Controller, Nov. 28, 2007, 50 pages.
Fairchild Semiconductor, FAN4810 Power Factor Correction Controller, Sep. 24, 2003, 14 pages.
Linear Technology Corporation. LT1248, Power Factor Controller, 1993, 12 pages.
National Semiconductor, LM3445 Work Book (Tips, Tricks, and Troubleshooting), undated, 29 pages.
ON Semiconductor, NCL30001, High-Efficiency Single Stage Power Factor Correction and Seep-Down Controller, Semiconductor Components Industries, LLC, Jan. 2010, 31 pages.

* cited by examiner

*Primary Examiner* — Daniel D Chang
(74) *Attorney, Agent, or Firm* — Lathrop & Gage LLP

(57) ABSTRACT

A power supply for powering one or more loads includes a boost circuit with power factor correction (PFC) that provides an operating voltage from an electrical power source, and a dimmer detection circuit that determines a dimming level applied to the electrical power source, and generates a pulse width modulated (PWM) signal based upon the dimming level. The power supply also includes one or more current control circuits, each current control circuit being associated with each of the one or more loads, and coupled in series with the operating voltage, its associated load, and a ground of the power supply, so as to control a current through its associated load in response to the PWM signal.

16 Claims, 16 Drawing Sheets

LED-BASED LIGHTING POWER SUPPLIES WITH POWER FACTOR CORRECTION AND DIMMING CONTROL

RELATED APPLICATIONS

This application claims priority to U.S. Provisional Patent Application Ser. No. 61/235,101, filed Aug. 19, 2009, which is incorporated herein by reference.

BACKGROUND

The power factor of an AC electric power system is defined as the ratio of the real power (voltage and current in phase) flowing to a load, to apparent power (voltage and current out of phase), and is a number between 0 and 1 (frequently expressed as a percentage, e.g. 0.5 power factor=50% power factor). Real power is the capacity of a circuit for performing work in a particular time. Apparent power is the product of the current and voltage of the circuit. Energy stored in the load and returned to the source, or non-linearities in the load that distort the wave shape of the current drawn from the source, often cause the apparent power to be greater than the real power. A load with low power factor draws more current than a load with a high power factor for the same amount of useful power transferred, and thereby causes higher resistive losses in wiring. It is therefore desirable to correct power factor for many types of load.

Non-linear loads, such as rectifiers, distort the current drawn from the system into a non-sinusoidal waveform. Non-linear loads require active power factor correction to counter-act the distortion and raise the power factor. Power factor correction may occur within equipment at a central substation, within equipment throughout a distribution system, or may be performed within power-consuming equipment.

A typical switched-mode power supply, as found in many consumer products, first powers a DC bus, using a bridge rectifier or similar circuit. The output voltage is then derived from this DC bus. Since rectifiers are non-linear devices, the input current is highly non-linear and has a low power factor resulting from energy at harmonics of the frequency of the voltage. Regulatory agencies such as the EU have set harmonic limits as a method of improving power factor. Declining component cost has hastened implementation of power factor correction. To comply with current EU standard EN61000-3-2, all switched-mode power supplies with output power more than 75 W must include power factor correction (PFC). 80 PLUS power supply certification requires power factor to be corrected to 0.9 or greater.

To achieve a higher power factor, Active Power Factor Correction (active PFC) is used to control the amount of power drawn by a load, in order to obtain a power factor as close as possible to unity. In most applications, the active PFC controls the input current of the load so that the current waveform is proportional to the mains voltage waveform (a sine wave).

Some types of active PFC are: Boost circuits, Buck circuits, and Buck-boost circuits, and may be implemented as single-stage or multi-stage. In the case of a switched-mode power supply, an active PFC circuit may use a boost converter inserted between the bridge rectifier and the main input capacitors. The boost converter attempts to maintain a constant DC bus voltage on its output while drawing a current that is always in phase with and at the same frequency as the line voltage. Typically, a second switched-mode converter inside the power supply produces the desired output voltage from the DC bus voltage. This approach requires additional semiconductor switches and control electronics, but permits using cheaper and smaller passive components than passive PFC. Switched-mode power supplies with passive PFC can achieve power factor of about 0.7-0.75, whereas switched-mode power supplies with active PFC, may achieve a power factor up to 0.99. Without PFC, switched mode power supplies typically have a power factor of about 0.55-0.65.

FIG. 1 shows one exemplary prior art power device 100 with controlled output power and power factor correction (PFC). Power device 100 is shown driving a load 114. A first section 102 of device 100 implements PFC and a second section 104 provides an isolated output voltage 108 through a transformer 106. In this example, an integrated circuit NCP1603 facilitates PFC within first section 102 and includes a pulse width modulation (PWM) circuit to implement the secondary switched-mode power conversion, within second section 104, as commonly used in power supply devices.

In this example, load 114 operates at a voltage 112 that is provided by a voltage regulator 110 which uses an output voltage 108 of second section 104. Second section 104 operates in a switched-mode to generate voltage 108 from transformer 106. Second section 104 includes optical feedback to the integrated circuit which operates to maintain voltage 108 irrespective of current drawn by load 114 and voltage supplied by first section 102. At startup of device 100, first section 102 operates to produce an operating voltage 105 to supply second section 104. To avoid startup problems where second section 104 overloads first section 102 when attempting to provide voltage 108, and hence voltage 113 to load 114, the integrated circuit typically delays the start of second section 104, for between 0.5 and 3 seconds, to allow first section 102 to attain operating voltage 105. Where load 114 represents a lighting application, such startup delay is undesirable.

Further, in this example, output voltage 108 of device 100 may contain ripple from second section 104, since second section 104 operates by generating an alternating current through transformer 106.

As shown, device 100 includes voltage regulator 110 to reduce voltage 108 to voltage 112 as required by load 114. Where voltage 112 is varied to control operation of load 114 (i.e., voltage regulator 110 operates to vary voltage 112), power loss in the form of dissipated heat from voltage regulator 110 may be undesirable. For example, using the simple equation of "watts=amps*volts", where voltage 108 is 20V and current drawn by load 114 is 1 A at 10V, power dissipation by voltage regulator 110 is 10 W, which result in an efficiency of only 50% (since power used by load 114 is 10 W) or less for device 100.

In particular, where voltage 112 supplied to load 114, and hence current through load 114, varies, efficiency of device 100 is dependent on the voltage drop across, and current through, voltage regulator 110. The greater the voltage drop across the regulator, the greater the power loss and the lower the efficiency.

An issue currently confronting LED manufacturers and the LED lighting industry is the sensitivity of human perception to the properties of LED light, and the difficulty of precise process control in LED manufacturing such that spectral differences among LEDs are not objectionable in lighting products. At the present time, LED manufacturers and the LED lighting industry are working together to identify and segregate LEDs with specific spectral properties such that end users can select appropriately "warm" or "cool" LED lighting, and so that mixtures of LEDs with differing spectral properties do not present a nuisance or distraction within a fixture or across fixtures in an installation. It is typical for LED lighting manufacturers to carefully order LEDs from single LED manufacturer batches and to track them for use in particular light fixture orders. The present necessity to do so can have negative implications for inventory management and production scheduling—that is, it is expensive and/or risky to build "to stock" because product can become useless if the product built does not include a specific batch of LEDs needed for a future order.

SUMMARY

In an embodiment, a power supply for powering a load includes a boost circuit with power factor correction (PFC) that derives an operating voltage from an electrical power source, a current control circuit that controls a current through the load, and a voltage control circuit that generates a feedback voltage to the boost circuit to control the operating voltage. The feedback voltage is controlled to be substantially equal to the sum of (a) a voltage required across the load to drive the current through the load, (b) half of a maximum peak-to-peak voltage of a ripple on the operating voltage, and (c) a minimum voltage drop across the current control circuit. The current control circuit operates to control the current through the load with minimal heat loss from the current control circuit and without ripple on the current.

In another embodiment, a method drives a load using a boost circuit with power factor correction (PFC), a current control circuit, and a voltage feedback circuit. Electrical power is received at the boost circuit and an operating voltage is generated, based upon a voltage feedback signal, within the boost circuit. The current through the load is controlled using a current sink of the current control circuit that is connected in series with the load. The current sink is controlled based upon a difference between a first voltage across a sense resistor of the current control circuit connected in series with the load, and a reference voltage representative of a desired current through the load. The voltage feedback signal is generated based upon a second voltage sensed at the current sink such that the operating voltage produced by the boost circuit is substantially equal to the sum of (a) a voltage drop produced across the load by the current through the load, (b) half of a maximum peak-to-peak voltage of a ripple on the operating voltage, and (c) a minimum voltage drop across the current control circuit. Current through the load is substantially continuous.

In another embodiment, a power supply for powering one or more loads includes a boost circuit with power factor correction (PFC) that provides an operating voltage from an electrical power source, and a dimmer detection circuit that (a) determines a dimming level applied to the electrical power source, and (b) generates a pulse width modulated (PWM) signal based upon the dimming level. The power supply also includes one or more current control circuits, each current control circuit being (c) associated with each of the one or more loads, and (d) coupled in series with the operating voltage, its associated load, and a ground of the power supply, so as to control a current through its associated load in response to the PWM signal.

In another embodiment, a method for driving at least one load using a boost circuit with power factor correction (PFC), a dimmer detection circuit, and a current control circuit includes receiving electrical power at the boost circuit and generating an operating voltage within the boost circuit from the electrical power. The method also includes generating, within the dimmer detection circuit, a pulse width modulated (PWM) signal indicative of the dimming level, and controlling the current through the load using a switch of the current control circuit that is connected in series with the load, the switch being controlled based upon the PWM signal.

In another embodiment, a method for manufacturing LED-based lighting products includes manufacturing power supply subsystems for the lighting products, receiving a customer order, including an LED specification, for the lighting products, stocking LEDs to match the LED specification, manufacturing LED-based lighting fixtures that utilize the LEDs, and integrating the power supply subsystems with the LED-based lighting fixtures to form the lighting products.

In another embodiment, a method for manufacturing LED-based lighting products includes manufacturing power supply subsystems for the lighting products and manufacturing cabling operable to connect the power supply subsystems with LED-based lighting fixtures. The method also includes receiving a customer order, including an LED specification, for the lighting products, stocking LEDs to match the LED specification, manufacturing LED-based lighting fixtures that utilize the LEDs, and shipping sets of the power supply subsystems, the cabling and the LED-based lighting fixtures to fill the customer order.

DETAILED DESCRIPTION

Figure 1:
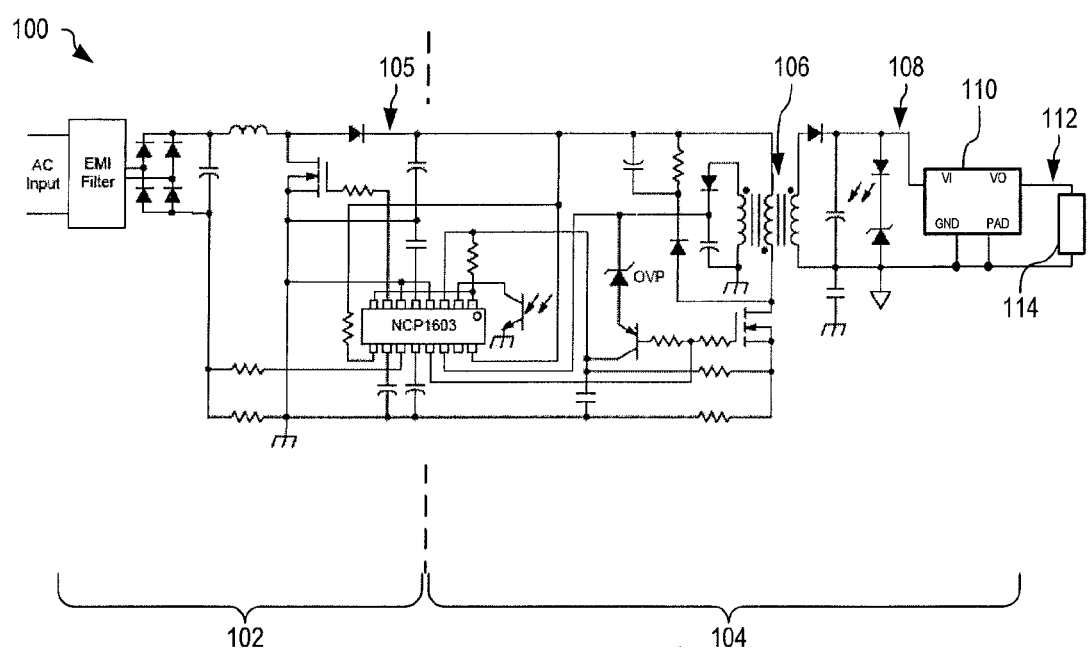
FIG. 1 shows one prior art power converter with power factor correction.
Figure 2:
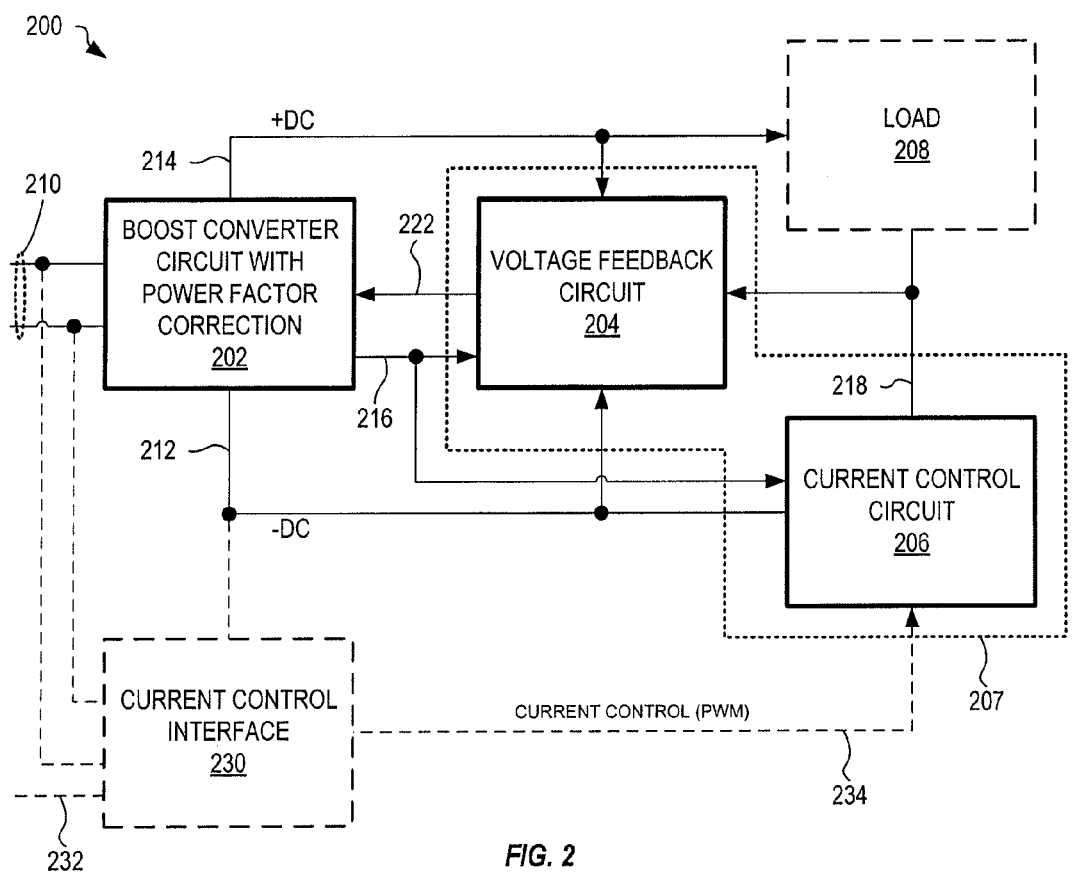
FIG. 2 is a block diagram illustrating one exemplary linear driver with power factor correction, in an embodiment.

FIG. 2 is a block diagram illustrating one exemplary power supply 200, having a linear driver and power factor correction, driving a load 208. Load 208 is shown in dashed outline as it is not considered part of power supply 200, which can power many different types of load. Power supply 200 includes a boost converter circuit (with power factor correction) 202, a voltage feedback circuit 204 and a current control circuit 206. Boost converter circuit 202, voltage feedback circuit 204 and current control circuit 206 cooperate to control current through load 208. In particular, voltage feedback circuit 204 and current control circuit 206 form a linear regulator circuit 207 that controls current through load 208 and minimizes power loss by regulating output voltage of boost converter circuit 202.

Boost converter circuit 202 receives alternating current (AC) power via AC input 210 and generates a positive direct current (DC) output 214 with reference to a negative DC output 212. Boost converter circuit 202 also generates a second positive DC output 216, with reference to negative DC output 212, that provides power for operating internal components of circuits 202, 204 and 206.

Boost converter circuit 202 provides positive DC output 214 at a voltage based upon a voltage feedback signal 222 from voltage feedback circuit 204. Voltage feedback circuit 204 generates voltage feedback signal 222 based upon a sensed voltage of current through a current path 218, which is provided by current control circuit 206 to return current from load 208 through negative DC output 212.

Optionally, power supply 200 may include a current control interface 230 to control current through current path 218 via current control circuit 206. In particular, current control circuit 206 controls current through current path 218 based upon a pulse width modulated (PWM) control signal 234. One exemplary current control interface 230 may be found in US Patent Application Publication number 2010/0079262 A1 of U.S. patent application Ser. No. 12,238,705, filed Sep. 26, 2008, titled "Systems and Methods for Conveying Information Using a Control Signal Referenced to Alternating Current (AC) Power", incorporated herein by reference.

Figure 3:
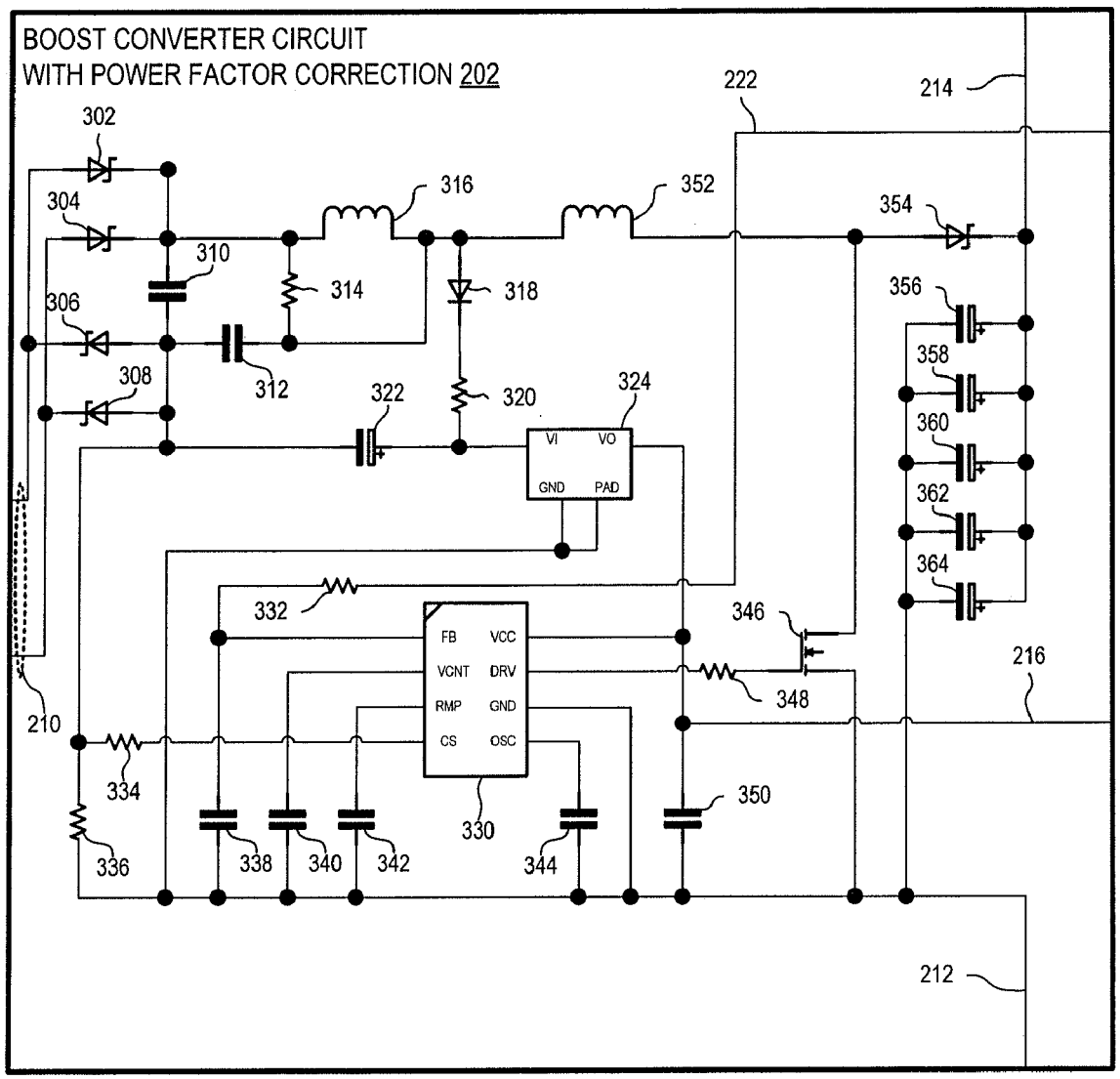
FIG. 3 shows exemplary components and connectivity of the boost converter circuit of FIG. 2, in an embodiment.

FIG. 3 shows exemplary components and connectivity of boost converter circuit 202 of FIG. 2. Circuit 202 includes an integrated circuit controller 330, a bridge rectifier formed of four diodes 302, 304, 306 and 308, a filter circuit formed of two capacitors 310, 312, a resistor 314 and an inductor 316, as shown. A diode 318, a resistor 320, decoupling capacitors 322, 350 and a regulator 324 provide regulated power for second DC output 216 (also see FIG. 2) and for integrated circuit controller 330. One example of integrated circuit controller 330 is NCP 1601, available from ON Semiconductor®.

Integrated circuit controller 330, resistors 332, 334, 336, 348, capacitors 338, 340, 342, 344, bulk capacitors 356, 358, 360, 362, 364, a diode 354, field-effect transistor (FET) 346, and an inductor 352 operate as a boost circuit to generate positive DC output 214 and negative DC output 212 (also see FIG. 2) based upon voltage feedback signal 222. Bulk capacitors 356, 358, 360, 362, and 364 are charged via diode 354, to maintain a desired voltage for positive DC output 214.

In one embodiment, exemplary values of components within circuit 202 are: diodes 302, 304, 306, 308 and 354 each may be SS24-D from ON Semiconductor; capacitors 310 and 312 each may have a value of 0.1 µF, 100V; decoupling capacitor 322 may have a value of 47 µF, 50V; capacitor 338 may have a value of 1000 pF; capacitor 340 may have a value of 0.1 µF; capacitor 342 may have a value of 330 pF; capacitor 344 may have a value of 100 pF; decoupling capacitor 350 may have a value of 0.1 µF; capacitor 356 may have a value of 0.1 µF, 100V electrolytic; capacitors 358, 360, 362, and 364 each may have a value of 100 µF, 100 V electrolytic; diode 318 may be a BAL99LT1; inductors 316 and 352 may have values 150 µH and 33 µH, respectively; resistors 320, 332, 334, 336, 348 may have values 0.2 ohms, 33 ohms, 1 K ohms, 0.067 ohms, and 10 ohms, respectively; regulator 324 may be a 78L15 15 V regulator; integrated circuit controller 330 may be a NCP1601, available from ON Semiconductor; and transistor 346 may be a ZXMN10A25G.

Figure 4:
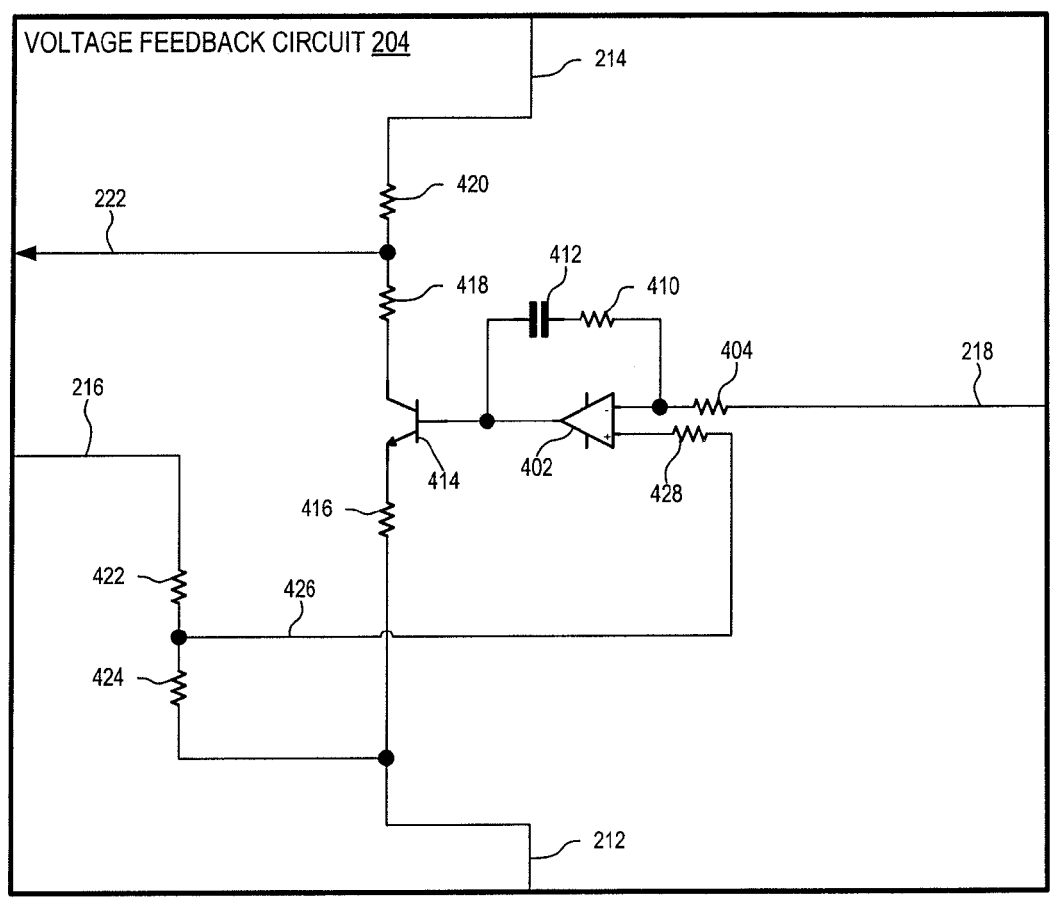
FIG. 4 shows exemplary components of the voltage feedback circuit of FIG. 2, in an embodiment.

FIG. 4 shows exemplary components and connectivity of voltage feedback circuit 204. An amplifier 402 is configured with capacitor 412 and resistors 410 and 404 to integrate a sensed voltage of current path 218 (also see FIG. 2) and to drive a base of transistor 414. An emitter and collector of transistor 414 serially connect within a chain of resistors 420, 418 and 416 between positive DC output 214 and negative DC output 212 such that a voltage of voltage feedback signal 222, between resistors 418 and 420, is controlled based upon a voltage of current path 218 with reference to positive DC output 214. A pair of resistors 422 and 424 form a voltage divider between second DC output 216 and negative DC output 212 to generate a reference voltage 426 that is input to amplifier 402 via a resistor 428.

In one embodiment, exemplary component values are: amplifier 402 may be a LM358D; transistor 414 may be a BC846B; resistors 404, 410, 416, 418, 420, 422, 424 and 428 may have values 100 K ohms, 1 K ohms, 1 K ohms, 20 K ohms, 10 K ohms, 10 K ohms, 2 K ohms and 100 K ohms, respectively; and capacitor 412 may have a value of 1 µF.

Figure 5:
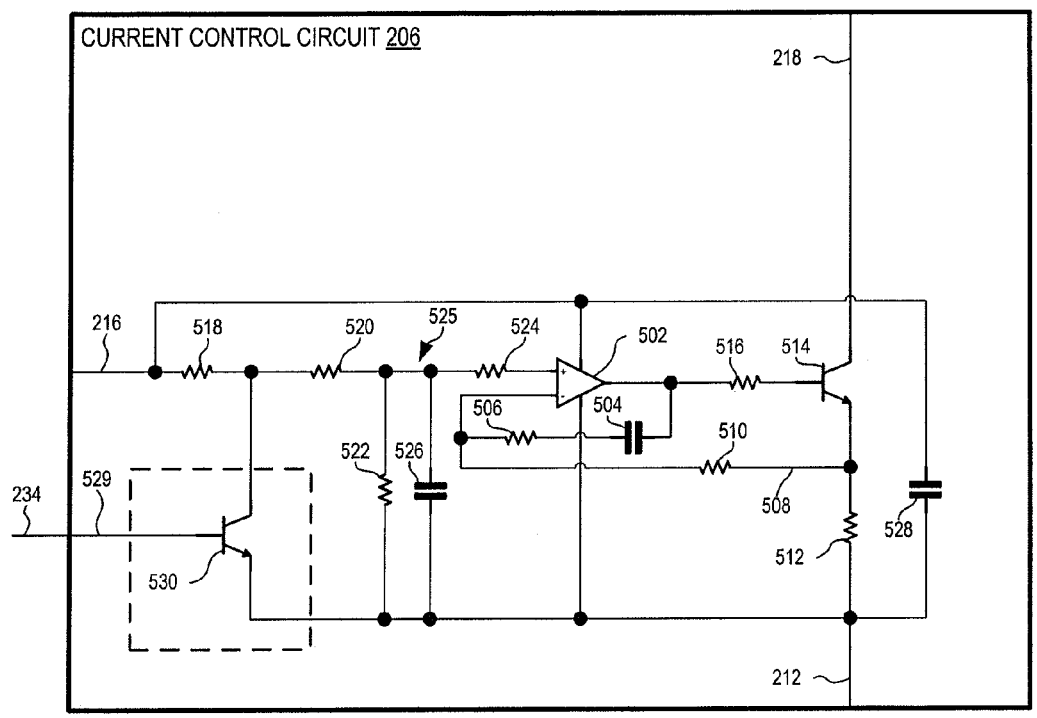
FIG. 5 shows exemplary components of the current control circuit of FIG. 2, in an embodiment.

FIG. 5 shows exemplary components and connectivity of current control circuit 206 of FIG. 2. Current control circuit 206 includes resistors 518, 520, and 522 that are serially connected between second DC output 216 and negative DC output 212 (also see FIG. 2) and generate a reference voltage at a point 525. Current control circuit 206 also includes an amplifier 502, resistors 506, 524 and a capacitor 504 that are configured to integrate the reference voltage at point 525 and to drive a base of a current sink transistor 514 via a resistor 516. The reference voltage at point 525 also connects to a first lead of a capacitor 526, and a second lead of capacitor 526 connects to negative DC output 212, such that capacitor 526 prevents rapid change in the reference voltage. A collector of current sink transistor 514 provides current path 218, and an emitter of transistor 514 connects to a current sense resistor 512, which in turn connects to negative DC output 212 to provide a return path for current path 218. Sensed current signal 508, at the emitter of transistor 514, is fed back to amplifier 502 via a resistor 510. Amplifier 502 operates to control current through sense resistor 512 (and hence current path 218) using transistor 514 to maintain a voltage of sensed current signal 508 substantially equal to the reference voltage at point 525.

When power supply 200 includes current control interface 230 (see FIG. 2), current control circuit 206 includes a current control input 529. A collector of an optional transistor 530 connects to a common junction of resistors 518 and 520, an emitter of transistor 530 connects to negative DC output 212 and a base of transistor 530 connects to current control input 529 to receive PWM control signal 234. PWM control signal 234 drives the base of transistor 530 to vary the voltage reference at point 525 which in turn causes amplifier 502 to control current through current sink transistor 514, thereby controlling a current through load 208 (FIG. 2).

Referring again to FIG. 2, since voltage feedback signal 222 is used within boost converter circuit 202 to control positive DC output 214, voltage feedback circuit 204 provides direct feedback based upon sensed current through load 208. Voltage of positive DC output 214 is controlled by voltage feedback circuit 204 such that any ripple in the voltage of positive DC output 214 has no effect on current through transistor 514 (FIG. 5), and such that excessive power is not dissipated by transistor 514. Transistor 514 operates close to saturation to minimize voltage drop across transistor 514. Thus, voltage feedback circuit 204 and current control circuit 206 operate differently from conventional linear regulation wherein excess voltage is typically dropped across the linear regulator, and thus power dissipates as heat.

In one embodiment, exemplary component values are: amplifier 502 may be a LM358D; transistor 514 may be a BC846B; resistors 506, 510, 512, 516, 518, 520, 522, and 524 may have values 4.99 K ohms, 4.99 K ohms, 2.495 ohms, 1 K ohms, 4.99 K ohms, 150 K ohms, 4.99 K ohms, and 4.99 K ohms, respectively; capacitors 504, 526 and 528 may have values 1000 pF, 0.1 µF, and 0.1 µF, respectively; and transistor 530, if included, may be of type BC846A.

Figure 6:
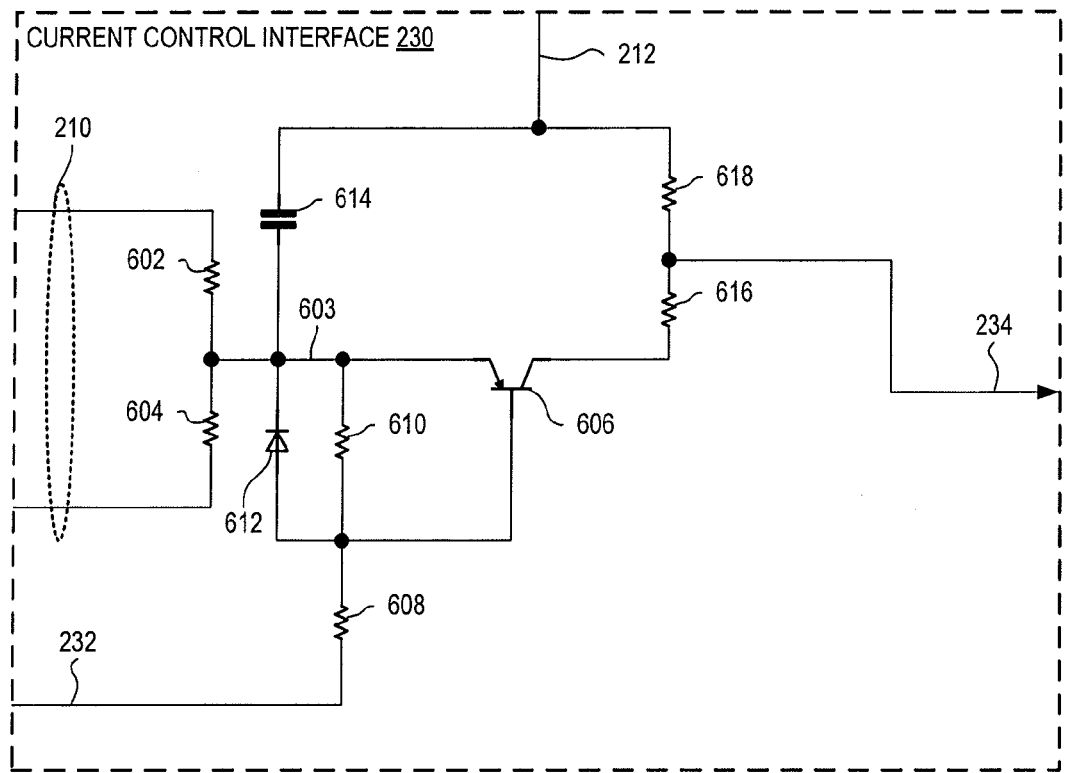
FIG. 6 shows exemplary components of the current control interface of FIG. 2, in an embodiment.

FIG. 6 shows exemplary components and connectivity of optional current control interface 230. As noted above, further information on use of an exemplary control signal referenced to an AC supply may be found in US Patent Application Publication number 2010/0079262 A1. Current control interface 230 has two resistors 602, 604, connected between lines of AC input 210 to form a reference voltage 603 that is substantially at a midpoint (in terms of voltage) between voltages of lines of AC input 210. The emitter of a PNP transistor 606 connects to reference voltage 603, and a base of transistor 606 connects to current control signal 232 via a resistor 608 and to reference voltage 603 via a resistor 610. A diode 612 connects between the base of transistor 606 and reference voltage 603 to prevent excessive reverse bias of transistor 606 from current control signal 232. A collector of transistor 606 connects to a first end of a resistor 616; the other end of resistor 616 provides PWM control signal 234. A resistor 618 connects between negative DC output 212 and PWM control signal 234 such that PWM control signal 234 is pulled 'low' when transistor 606 turns off A capacitor 614 decouples reference voltage 603 with respect to negative DC output 212. In operation, as current control signal 232 toggles, substantially between voltages of lines of AC input 210, PWM control signal 234 toggles substantially between voltages of negative DC power 212 and reference voltage 603.

In one embodiment, exemplary component values are: transistor 606 may be a BC856A; diode 612 may be a BAL99LT1; capacitor 614 may have a value of 1 µF; and resistors 602, 604, 608, 610, 616 and 618 may have values 10 K ohms, 10 K ohms, 470 K ohms, 470 K ohms, 100 K ohms, and 33 K ohms, respectively.

Figure 7:
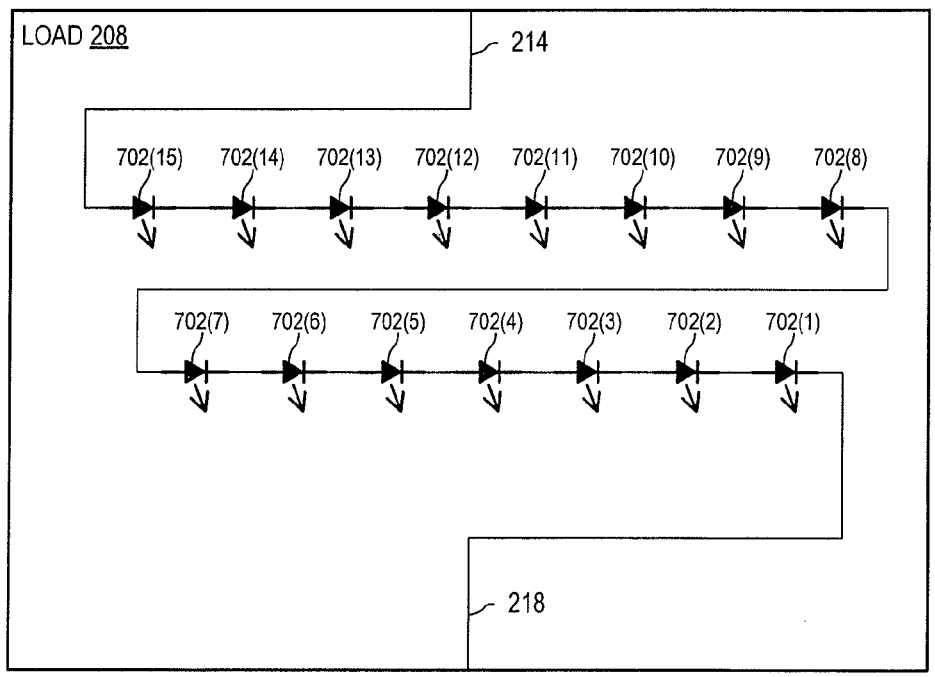
FIG. 7 shows one exemplary load formed as a lighting unit with fifteen light emitting diodes (LEDs).

FIG. 7 shows one exemplary load formed as a lighting unit with fifteen LEDs 702(1)-(15) connected in series between positive DC output 214 and current path 218. Light emitted by LEDs 702 is based upon current flowing through the LEDs, and thus is controlled by current control circuit 206 and voltage feedback circuit 204. Although load 208 is shown with fifteen LEDs 702, load 208 may consist of any number of LEDs and/or other components. That is, power supply 200 may provide power to any type of DC load. In the embodiment of FIG. 7, current control signal 232 may represent a dimming signal for controlling brightness of light output by LEDs 702. LEDs 702 may each be NS6L083BT-H1_S811 from Nichia.

In one example of operation, voltage feedback circuit 204 controls boost converter circuit 202 to output positive DC output 214 with a voltage substantially 2.5 volts higher than a voltage dropped across load 208 for a desired current through load 208. This 2.5 volts represents a minimum voltage drop across the current control circuit 206, plus half of a maximum peak-to-peak ripple voltage on positive DC output 214. By controlling the voltage of positive DC output 214, power loss (through heat dissipation) is minimized within current control circuit 206 since transistor 514 operates close to saturation (minimum resistance), but with sufficient variance to eliminate voltage ripple within positive DC output 214. For example, an operating voltage provided by positive DC output 214 is controlled to be substantially equal to a minimum voltage drop across load 208 for a desired current through load 208, plus half of an estimated maximum peak-to-peak ripple voltage, plus a minimum voltage drop across current control circuit 206 (e.g., a minimum voltage drop across transistor 514 and resistor 512). Current control circuit 206 thus removes any ripple voltage by controlling current through load 208. Thus, one advantage of power supply 200 is that load 208 is powered with direct current with substantially no ripple, while power loss by power supply 200 is minimized through use of voltage feedback signal 222 to control the voltage of positive DC output 214 from boost converter circuit 202.

A further advantage of power supply 200 is that linear regulator circuit 207 does not prevent boost converter circuit 202 from reaching operation voltage (as with prior art circuits that use boost conversion type circuits) and thereby reduces circuit complexity and timing. In particular, the use of a constant current load limits the current drawn from boost converter circuit 202 upon startup, whereas a constant power circuit, as typically used in the prior art, draws higher current when operating voltage is lower, and thereby overloads its boost conversion stage. For example, power supply 200 has less than the typical 0.5-3 second delay that is imposed by prior art circuits to enable their boost conversion stage to reach an operational voltage prior to activation of the constant power circuit. Power supply 200 minimizes such turn-on delays and avoids unstable operating conditions. In one example of operation, power supply 200 achieves a full operational current through load 208 within 100 mS from application of electrical power to AC input 210. In particular, power supply 200 incurs a delay caused by the initial charging of bulk capacitors 356, 358, 360, 362, and 364, which are nominally charged within a few (e.g., between two and four) cycles of power input to AC input 210.

In one embodiment, circuit 202 incorporates active power factor correction using an ON Semiconductor NCP 1601 integrated circuit (see integrated circuit controller 330, FIG. 3). This provides a DC voltage higher than the peak of the AC input that is then used by an LED driver stage. The problem with the LED driver being a standard high efficiency LED driver is that the PFC stage needs to be up to operating voltage before the LED driver is turned on. If this is not done, the LED driver loads the PFC stage and it never gets up to voltage. If a conventional linear regulator is used in stead of a high efficiency switcher, the overall efficiency is low and the additional thermal load would challenge fixture designs. If the LEDs were powered directly off the PFC output, the LED current would not be continuous, as there is several volts of ripple in the PFC output, even with large electrolytic filter capacitors.

The present design uses a linear regulation design in a second regulation stage to provide a constant current through connected LEDs (the load) and to remove ripple from the PFC output. However, unlike conventional circuits where voltage input to a linear regulator is constant, the voltage supplied to the linear regulator of circuit 202 is controlled to be about 2.5 volts higher than a desired voltage across the load, thus the linear regulator removes any ripple in the supplied voltage without dissipating excessive heat through voltage drop across the regulator. That is, output of a PFC stage is controlled to provide a voltage across the load and regulator that does not require excessive voltage to be dropped by the regulator to provide the desired current through the load. This leads to high efficiency, since the voltage dropped across the linear regulator is never greater than a minimum voltage drop needed to substantially remove ripple in voltage from the PFC stage. Further, since the current through the load is controlled linearly, when current through the load is reduced (e.g., through operation of optional transistor 530 and within current control circuit 206) it is still continuous and not modulated (e.g., through pulse width modulation) as in conventional lighting control. Thus, there is no "strobe effect" with lighting controlled by this circuit.

Figure 8:
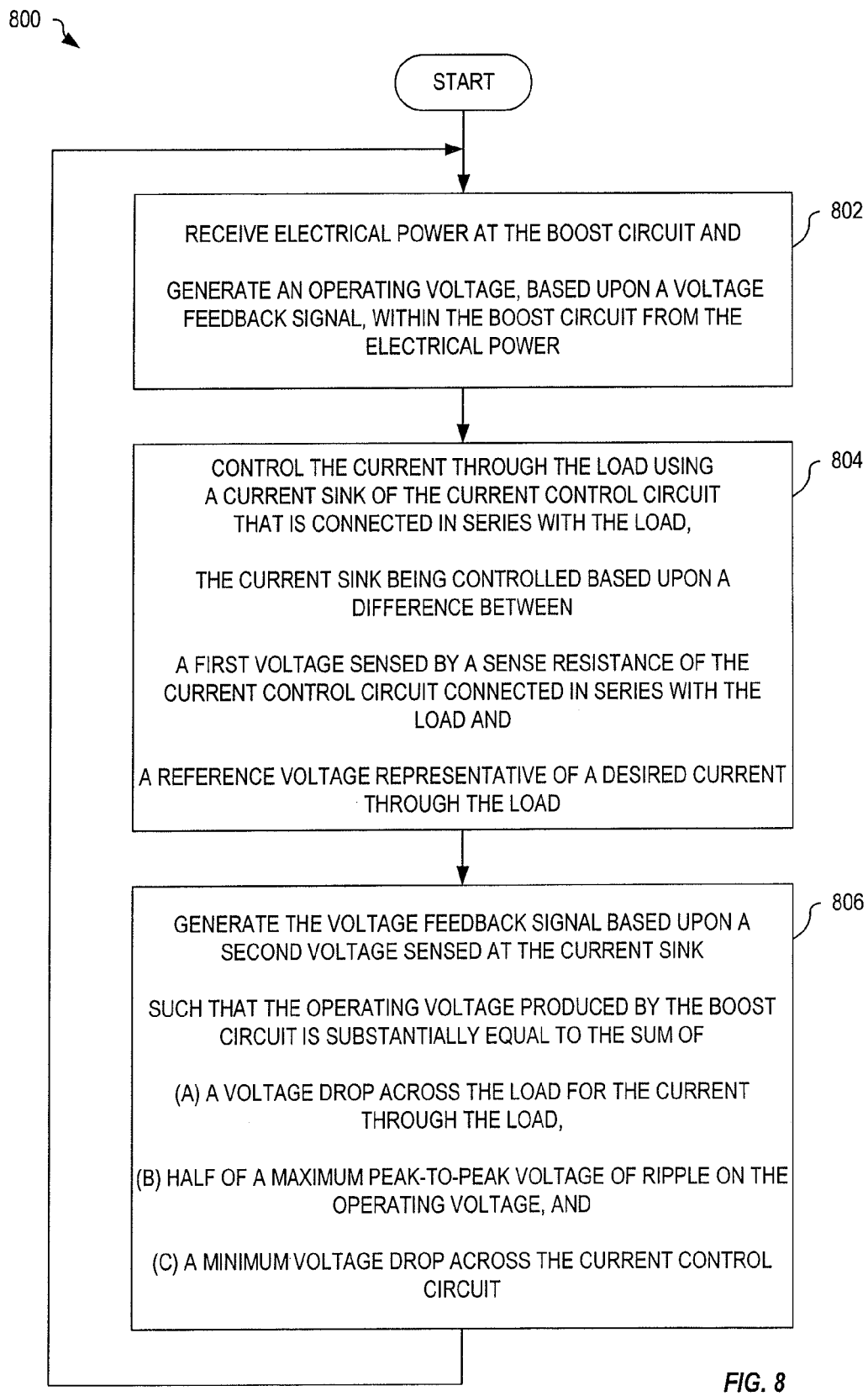
FIG. 8 shows one exemplary method for driving a load using a boost circuit with power factor correction (PFC), a current control circuit, and a voltage feedback circuit.

FIG. 8 shows one exemplary method 800 for driving a load using a boost circuit with power factor correction (PFC), a current control circuit, and a voltage feedback circuit. Method 800 may represent operation of power supply 200, FIG. 2.

In step 802, method 800 receives electrical power at the boost circuit and generates an operating voltage, based upon a voltage feedback signal, within the boost circuit from the electrical power. In one example of step 802, boost converter circuit 202 receives electrical power from AC input 210 and generates positive direct current (DC) output 214 with reference to negative DC output 212.

In step 804, method 800 controls the current through the load using a current sink of the current control circuit coupled in series with the load, the current sink being controlled based upon a difference between a first voltage sensed by a sense resistance of the current control circuit connected in series with the load and a reference voltage representative of a desired current through the load. In one example of step 804, current control circuit 206 uses current sink 514 to control current through load 208 based upon a difference between a voltage sensed across sense resistor 512 and a reference voltage at point 525.

In step 806, method 800 generates the voltage feedback signal, used in step 802, based upon a second voltage sensed at the current sink such that the operating voltage produced by the boost circuit is substantially equal to the sum of (a) a voltage drop across the load for the current through the load, (b) half of a maximum peak-to-peak voltage of ripple on the operating voltage, and (c) a minimum voltage drop across the current control circuit. In one example of step 806, voltage feedback circuit 204 generates voltage feedback signal 222 based upon a sensed voltage of current path 218 such that positive DC output 214 has a voltage substantially equal to the sum of the voltage drop across load 208, half of the maximum peak-to-peak ripple on positive DC output 214, and a minimum voltage drop across current control circuit 206. Power loss, dissipated as heat by current control circuit 206, is minimized while ripple is substantially removed from positive DC output 214 and current through load 208 is substantially continuous.

Lighting System with AC Dimming Control

Figure 9:
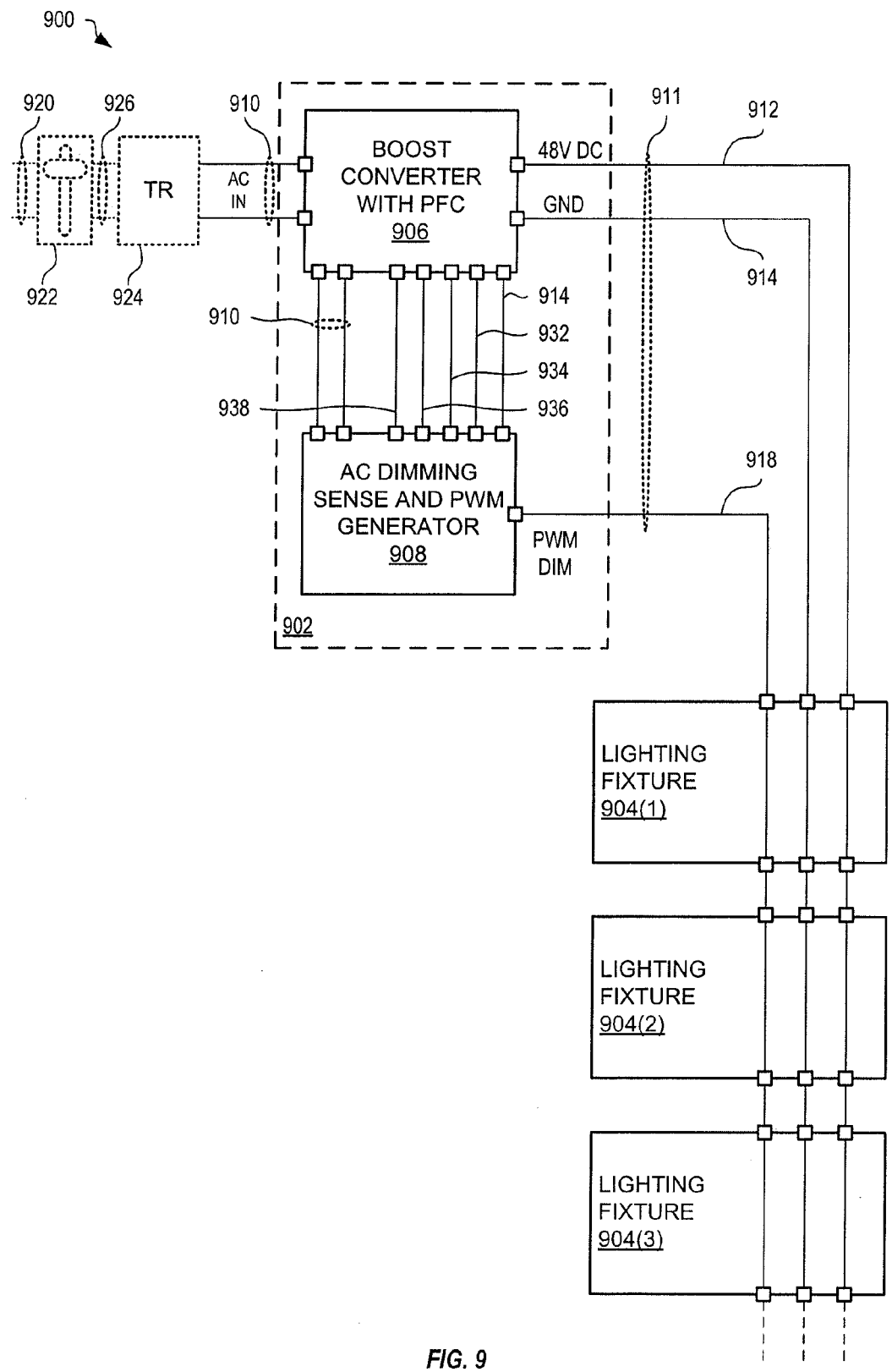
FIG. 9 shows one exemplary lighting system formed as a power supply that provides power to, and AC dimming control of, one or more lighting fixtures, in an embodiment.

FIG. 9 shows one exemplary lighting system 900 formed as a power supply 902 that provides power to, and AC dimming control of, one or more lighting fixtures 904. Power supply 902 receives AC power 910 (e.g., 24V AC) from a transformer 924 connected to AC power 920 (e.g., 110V AC) via an AC dimmer 922. AC dimmer 922 represents a conventional dimming device that connects to mains AC power (e.g., AC power 920) for controlling brightness (e.g., by dimming) AC powered lighting for example. Power supply 902 converts AC power 910 into DC power (e.g., 48V DC) and provides a PWM dimming control signal 918. The DC power and PWM dimming signal 918 are output in combination on a three rail bus 911. Bus 911 has a positive rail 912 (e.g., 48V), a ground rail 914 (e.g., 0V), and PWM dimming control signal 918.

Power supply 902 includes a boost converter 906 with power factor correction (PFC) that generates DC power on positive rail 912 with respect to ground rail 914, and a PWM dimming signal generator 908 that generates PWM dimming control signal 918 based upon detected AC dimming (e.g., as provided by AC dimmer 922) of AC power 910. Bus 911 connects power supply 902 to each lighting fixture 904. As shown in FIG. 9, bus 911 may pass through each lighting fixture 904 such that lighting fixtures 904 may be connected using a 'daisy chain' technique.

Figure 10:
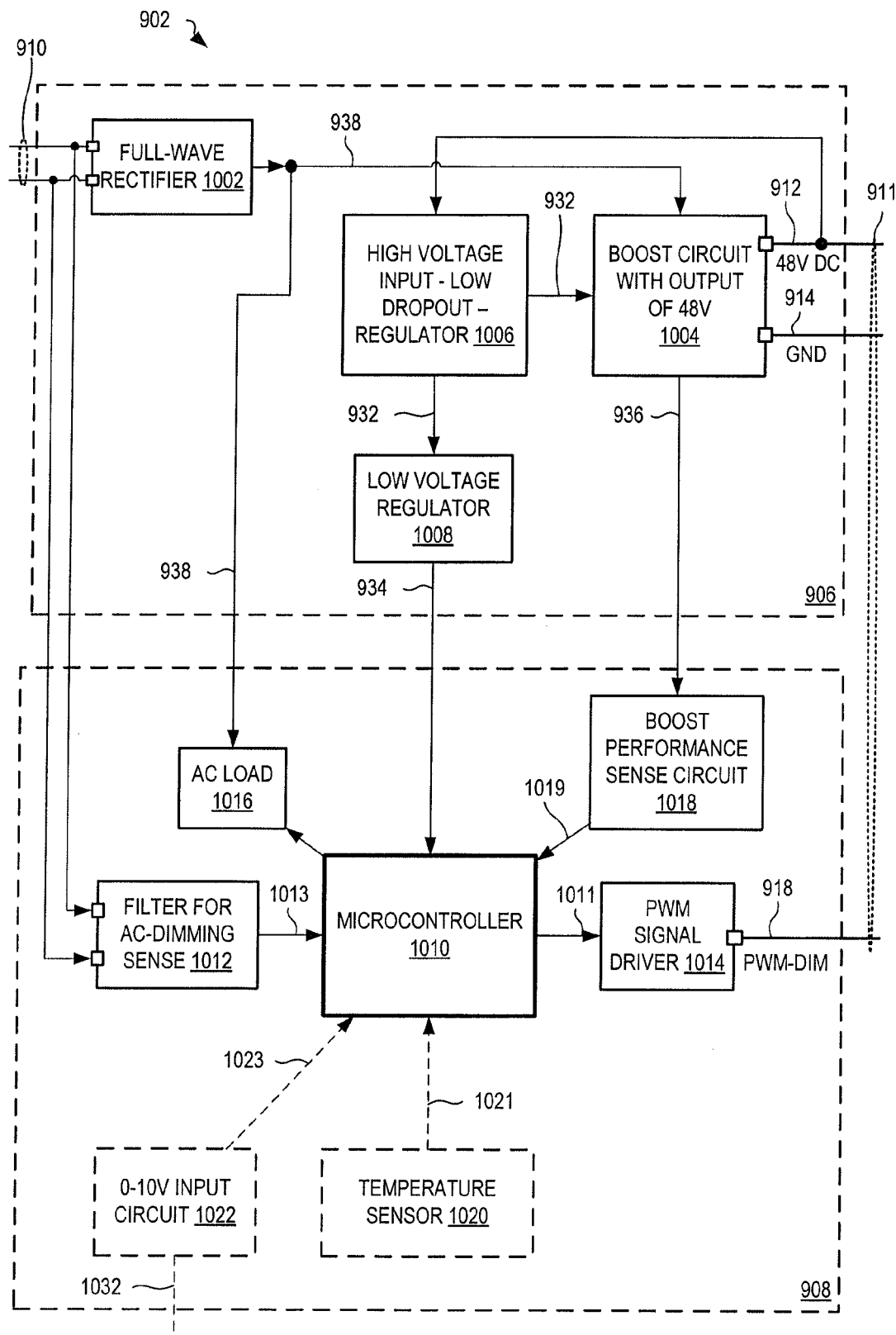
FIG. 10 is a block diagram showing exemplary functionality of the power supply of FIG. 9.

FIG. 10 is a block diagram showing exemplary functionality of power supply 902 of FIG. 9. Within FIG. 10, not all power (e.g., operational power 932 and second operational power 934) and ground (e.g., ground 914) connectivity is shown for clarity of illustration. AC power 910 is rectified in full wave rectifier 1002 and output as rectified power 938 to boost circuit 1004, which generates DC power for output onto positive rail 912 with respect to ground rail 914 of bus 911. Operation of boost circuit 1004 is based upon operational power 932 (e.g., 15V DC) received from a high-voltage input range, low drop-out, regulator 1006 that is powered from boost circuit 1004 (e.g., positive rail 912). Startup of boost circuit 1004 and regulator 1006 results from application of AC power 910 to power supply 902, wherein positive rail 912 quickly reaches the voltage of rectified power 938 (e.g., 24V DC). Regulator 1006 utilizes this power to generate operational power 932 that starts operation of boost circuit 1004, which raises the voltage of positive rail 912 to its desired voltage (e.g., 48V). Regulator 1006 is designed to operate over a large input voltage range (e.g., between a voltage just above its designed output voltage of 15V to the 48V output of boost circuit 1004) to maintain operation of boost circuit 1004.

Operational power 932 from regulator 1006 also provides power to a low voltage regulator 1008 that in turn provides a second operational power 934 (e.g., 3V or 5V DC) to a microcontroller 1010 (and components of power supply 902 that operate from the lower voltage). Microcontroller 1010 receives a dimming indication signal 1013 that is indicative of AC-dimming of AC power 910 from an AC-dimming sense filter 1012. AC dimmer 922 (see FIG. 9) represents a typical AC dimmer (e.g., using triacs or thyristors) for controlling dimming of lighting.

Figure 11:
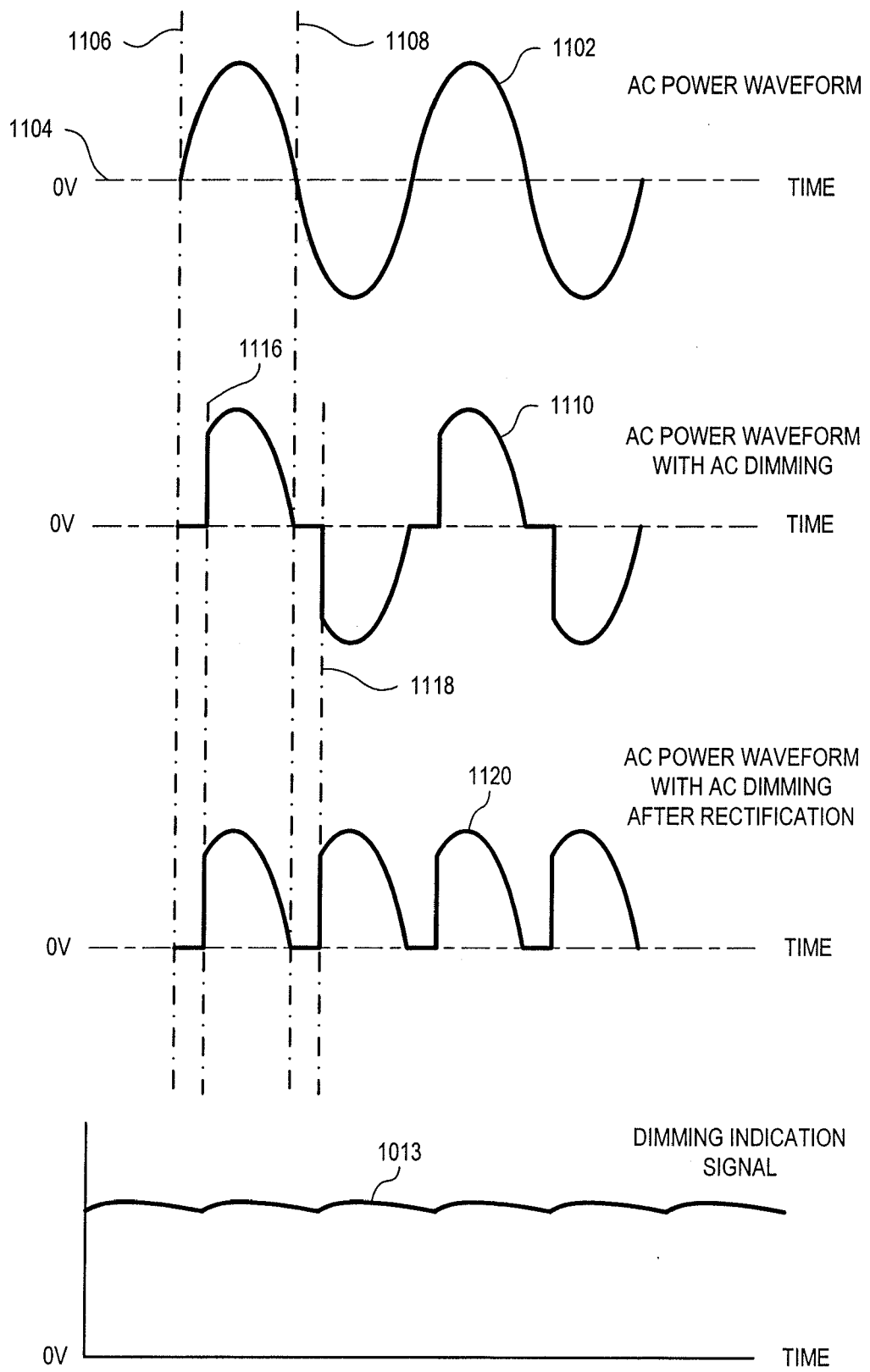
FIG. 11 shows exemplary waveforms of AC power and associated waveforms generated by the AC dimming sense filter of FIG. 10.

FIG. 11 shows exemplary waveforms of AC power 910 and associated waveforms generated by AC dimming sense filter 1012. A typical non-dimmed AC voltage waveform 1102 has a substantially sinusoidal shape that crosses a zero voltage line at zero-crossing points 1106 and 1108. In the following example, leading edge waveform modification is illustrated. However, AC dimming based upon trailing edge waveform modification is also detected by AC-dimming sense filter 1012. That is, AC-dimming sense filter 1012 functions with most standard AC dimmers currently on the market to generate dimming indication signal 1013.

AC voltage waveform 1102 of FIG. 11 may represent AC voltage 920 of FIG. 9. As shown on waveform 1110, where AC dimmer 922 is set to "dim" lighting, turn on of each AC power cycle is delayed from zero crossing points 1106 and 1108 to turn on points 1116 and 1118, respectively. The greater the 'dimming' level applied by AC dimmer 922, the greater the delay is between zero-crossing points 1106 and 1108 to turn on points 1116 and 1118, respectively. In one example of operation, AC-dimming sense filter 1012 first rectifies waveform 1110 to form waveform 1120, which is then passed through a filter circuit (e.g., a low frequency low-pass filter) that generates dimming indication signal 1013, a DC level of which is indicative of the AC dimming level of AC voltage 910 imparted by AC dimmer 922. In one example of operation, as the AC dimming level imparted onto AC power 910 by AC dimmer 922 increases, the DC level of dimming indication signal 1013 decreases.

Referring back to FIG. 10, microcontroller 1010 periodically samples and converts (e.g., using an internal analog-to-digital converter) dimming indication signal 1013 into a digital value indicative of the AC dimming level imparted by AC dimmer 922. Microcontroller 1010 may utilize algorithms, such as filtering and averaging, for further processing of these digital values to determine the AC dimming level imparted by AC dimmer 922, and then generate a PWM dimming control signal 1011 that has a pulse width based upon the AC dimming level determined from dimming indication signal 1013. PWM dimming control signal is converted into PWM dimming signal 918 by a PWM signal driver 1014.

As is typical of triac based dimmers, AC dimmer 922 may function erratically when insufficient current is drawn at high dimming levels (e.g., 90% or greater), which often results in unwanted flickering of conventional lighting controlled by the AC dimmer. Since lighting fixtures 904 utilize LED based lighting, loading of AC power 910 is significantly lower in comparison to where conventional incandescent illumination is utilized, which could exacerbate the erratic behavior of AC dimmer 922 at high AC dimming levels. Therefore, power supply 902 may include an AC load 1016 under control of microcontroller 1010. Microcontroller 1010 controls AC load 1016 to draw additional current directly from rectified power 938 when the determined AC dimming level is high (e.g., greater than 90%), thereby reducing erratic function of AC dimmer 922.

Power supply 902 may also include a boost performance sense circuit 1018 that receives an integrator signal 936 of boost circuit 1004 and provides a boost performance signal 1019 indicative of operation of boost circuit 1004 to microcontroller 1010. Microcontroller 1010 may periodically sample and convert (e.g., using an internal analog-to-digital converter) boost performance signal 1019 into a digital value that is indicative of performance of boost circuit 1004. For example, performance of boost circuit 1004 may vary during a startup period of power supply 902 and also when loading of positive rail 912 changes as a result of changes in AC dimming level that changes power drawn from positive rail 912 by each connected lighting fixture 904. One or more algorithms within microcontroller 1010 may utilize the determined performance of boost circuit 1004 when determining PWM dimming control signal 1011, for example to prevent too rapid a dimming change within lighting fixtures 904.

Optionally, power supply 902 may include a temperature sensor 1020 that provides a temperature signal 1021 indicative of temperature of power supply 902 to microcontroller 1010. Microcontroller 1010 may periodically sample and convert (e.g., using an internal analog-to-digital converter) temperature signal 1021 into a digital value indicative of temperature of power supply 902. Microcontroller 1010 may include algorithms and rules that modify PWM dimming signal 918 based upon determined temperature of power supply 902. For example, microcontroller may increase the dimming level of PWM dimming control signal 1011 to reduce loading of power supply 902 by lighting fixtures 904 if temperature of power supply 902 exceeds a defined maximum temperature threshold.

Optionally, power supply 902 may include one or more input circuits 1022 for receiving information via an input signal 1032 from external circuitry. Input circuit 1022 may generate an input signal 1023 that conveys information from input signal 1032 to microcontroller 1010 (e.g., converting a signal range of input signal 1032 into a range suitable for microcontroller 1010. Microcontroller 1010 may periodically sample and convert (e.g., using an internal analog-to-digital converter) each input signal 1023 into one or more digital values for evaluation. In one example, input circuit 1022 receives input signal 1032 from a motion detector (not shown) that provides information of detected movement within an area monitored by the motion detector. Microcontroller 1010, upon evaluating input signal 1023, may (a) increase dimming level of PWM dimming signal 918 when no movement is indicated for a defined period to reduce illumination provided by lighting fixtures 904 (e.g., to save power), and/or may (b) reduce the dimming level of PWM dimming signal 918 when movement is indicated, to provide additional illumination from lighting fixtures 904 (e.g., to illuminate the area). In another example, input circuit 1022 receives information from a $CO_2$ sensor (or a smoke detector), whereupon microcontroller 1010 controls PWM dimming signal 918 to flash illumination from lighting fixtures 904 as a warning if the information indicates danger.

Figure 12:
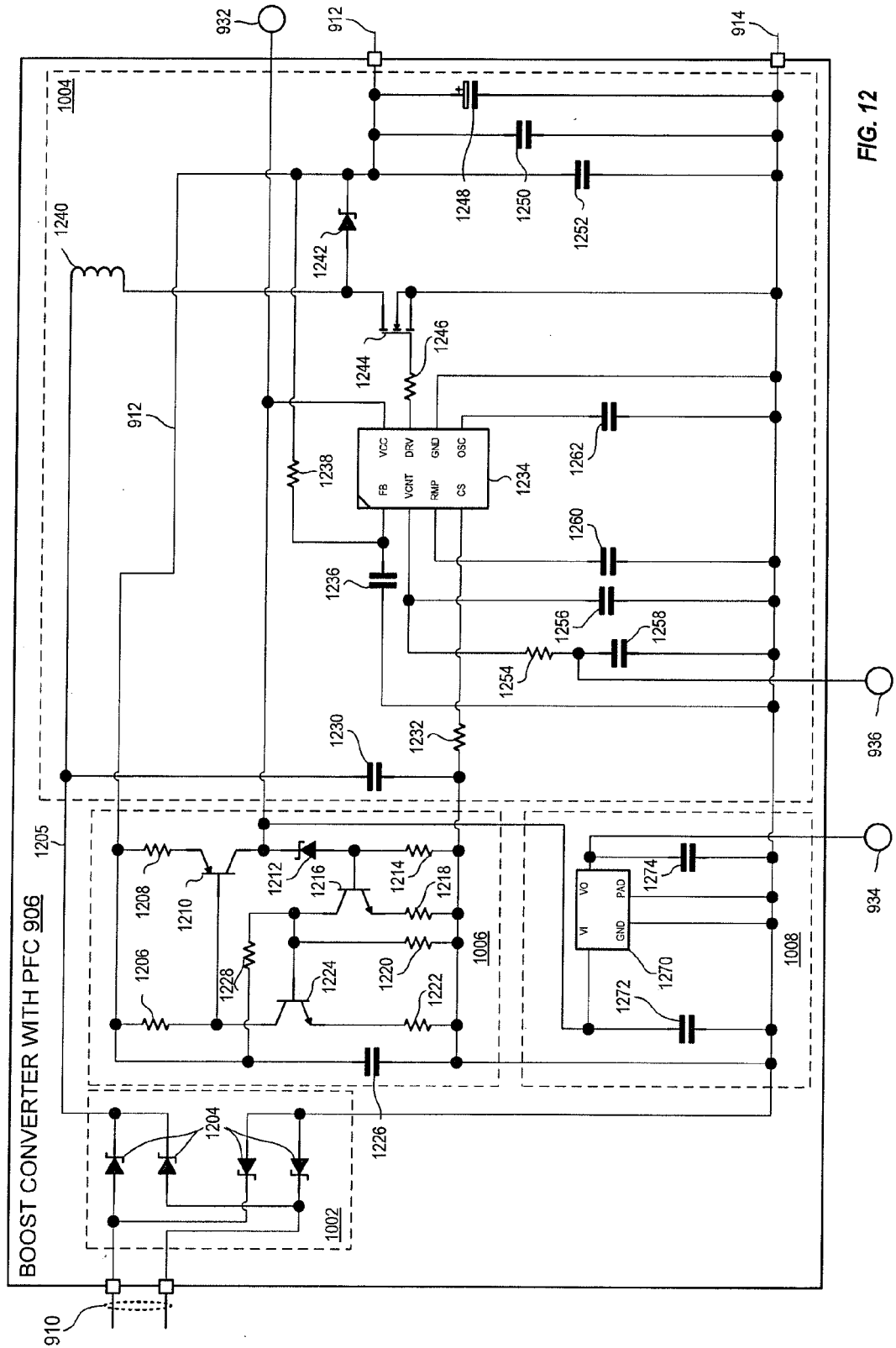
FIG. 12 shows the boost converter of FIG. 9 in exemplary detail.

FIG. 12 shows boost converter 906 of FIG. 9 in exemplary detail. FIG. 12 is best viewed with FIGS. 9 and 10 and the following description. Four diodes 1204 are configured as a full-wave bridge rectifier 1002 to provide rectified power 1205 that is positive with respect to ground rail 914. Regulator 1006 is formed with resistors 1206, 1208, 1214, 1218, 1220, 1222, and 1228, a capacitor 1226, NPN transistors 1216 and 1224, and a PNP transistor 1210, and outputs operational power 932, as shown. Boost circuit 1004 (see FIG. 10) is formed with an integrated circuit controller 1234, resistors 1232, 1238, 1246, and 1254, capacitors 1230, 1236, 1248, 1250, 1252, 1256, 1258, 1260, and 1262, an inductor 1240, a diode 1242, and FET 1244. Boost circuit 1004 receives power from rectified power 1205 and operates to boost the rectified power voltage to provide positive rail 912.

A regulator 1270 and decoupling capacitors 1272 and 1274 are connected to form low voltage regulator 1008 that provides second operational power 924 from operational power 932.

Upon startup of circuit 906, capacitor 1248 is initially charged from rectified power 1205 via inductor 1240 and diode 1242 to a voltage that allows regulator 1006 to produce operational voltage 932. Once operational voltage 932 is present, integrated circuit controller 1234 commences operation to boost positive rail 912 to a designed operational voltage (e.g., 48V). Integrator signal 936 is derived from the connection between capacitor 1258 and resistor 1254 that connect in series to form an integrator input to integrated circuit controller 1234.

In one embodiment, diodes 1204 may be dual power Schottky diodes. Resistors 1206, 1208, 1214, 1218, 1220, 1222, and 1228 may have values of 1 K ohms, 20 ohms, 4.99 K ohms, 2 K ohms, 82.5 K ohms, 2 K ohms, and 82.5 K ohms, respectively. Capacitor 1226 may have a value of 0.1 μF at 100V. NPN transistors 1216 and 1224 are each a BC 849, and PNP transistor 1210 is a power transistor. Integrated circuit controller 1234 is for example an NCP 1601, available from ON Semiconductor. Resistors 1232, 1238, 1246, and 1254 may have values of 1 K ohms, 220 K ohms, 10 ohms, and 10 K ohms, respectively. Capacitors 1230, 1236, 1248, 1250, 1252, 1256, 1258, 1260, and 1262 may have values of 3.3 μF 50V, 1000 pF, 4700 μF 63V, 1.0 μF 100V, 0.1 μF 100V, 0.01 μF, 0.1 μF, 470 pF, and 150 pF, respectively. Inductor 1240 may have a value of 10.0 μH, diode 1242 may be a V10P10 277 A, and FET 1244 may be of type FQPF70N10. Regulator 1270 is for example a 78LSOT89R, and decoupling capacitors 1272 and 1274 may each have a value of 0.1 µF.

Figure 13:
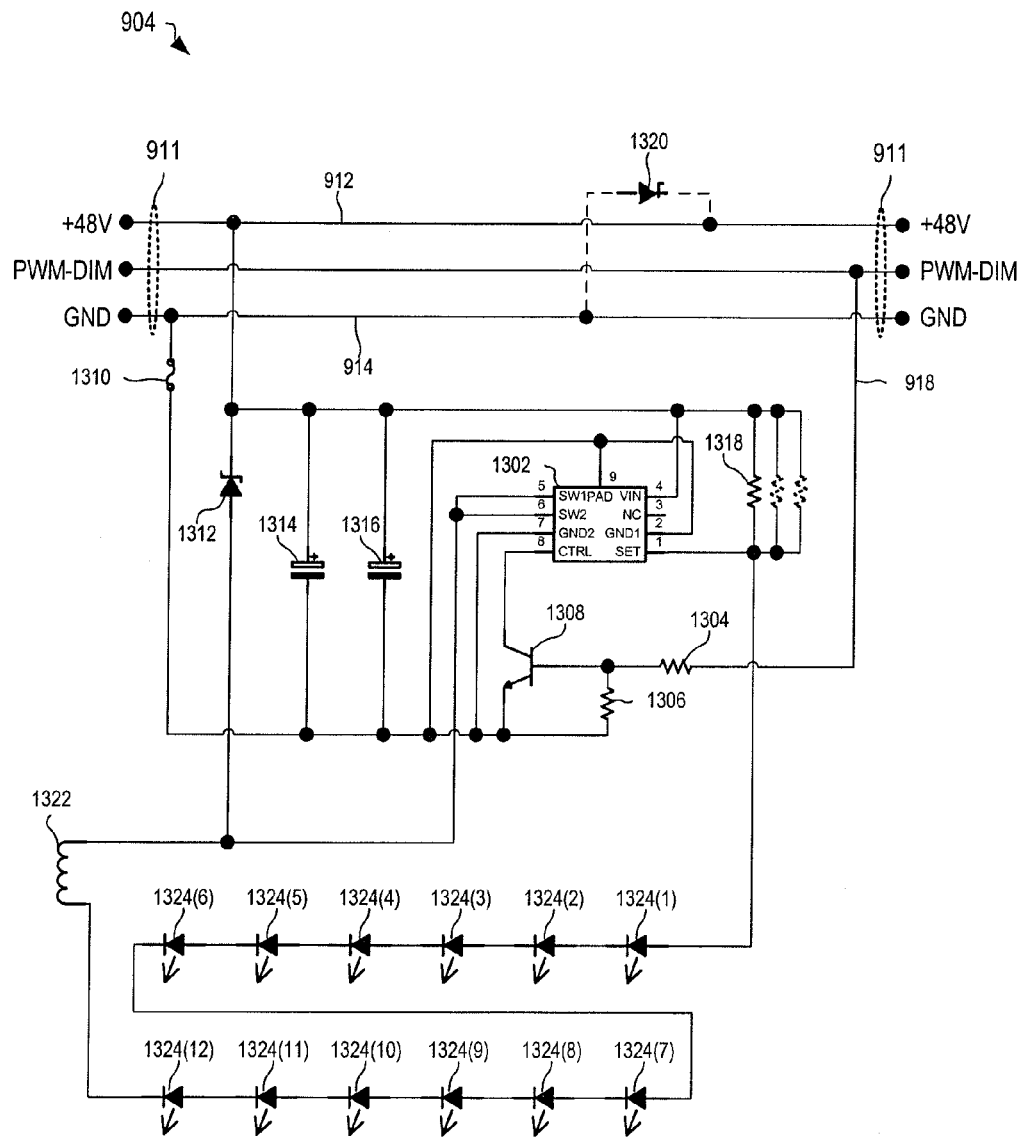
FIG. 13 is a schematic showing exemplary detail of the lighting fixture of FIG. 9.

FIG. 13 is a schematic diagram showing exemplary detail of lighting fixture 904 of FIG. 9. A control input of an integrated circuit controller 1302 receives PWM dimming control signal 918 via a conditioning circuit formed of resistors 1304 and 1306 and NPN transistor 1308. Controller 1302, in cooperation with a resistor 1318, capacitors 1314, 1316, inductor 1322 and diode 1312, controls current through a load formed of LEDs 1324 connected in series. A maximum output current of controller 1302 is set by resistor 1318 (connected between the VIN and SET input pins of controller 1302). For example, if resistor 1318 has a resistance of 0.23 ohms, the maximum current through LEDs 1324 is 865 mA. In another example, if resistor 1318 has a resistance of 0.5 ohms, maximum current through LEDs 1324 is 400 mA. Resistor 1318, as shown in FIG. 13, may represent more than one resistor connected in parallel. The twelve LEDs 1324 shown in FIG. 13 are exemplary, and more or fewer LEDs may be used within lighting fixture 904 without departing from the scope hereof.

Dimming is achieved by applying PWM dimming control signal 918 at the CTRL input pin of controller 1302. An input voltage of 0.2V or lower at CTRL input of controller 1302 (e.g., when PWM dimming signal 918 is held in a high state) switches off the output and puts controller 1302 into a low-current standby state. An optional diode 1320 between positive rail 912 and ground rail 914 prevent reverse voltage being applied to lighting fixture 904. Lighting fixture 904 may also include a fuse 1310 for additional overload protection.

In one embodiment, controller 1302 is for example an AP8802 step-down DC/DC converter from Diodes Incorporated. Resistors 1304 and 1306 may each have a value of 10.0K. NPN transistor 1308 may be a BC849. Resistor 1318 is selected to define a maximum current through diodes 1324 of lighting fixture 904, and may have a value in the range 0.5-0.23 ohms. Capacitors 1314 and 1316 may have values of 0.1 µF and 2.2 µF, respectively. Inductor 1322 may have a value of 150 µH, diode 1312 may represent an ES2BA superfast power diode, and LEDs 1324 may be supplied by one or more of Nichia, Cree and Rebel.

Figure 14:
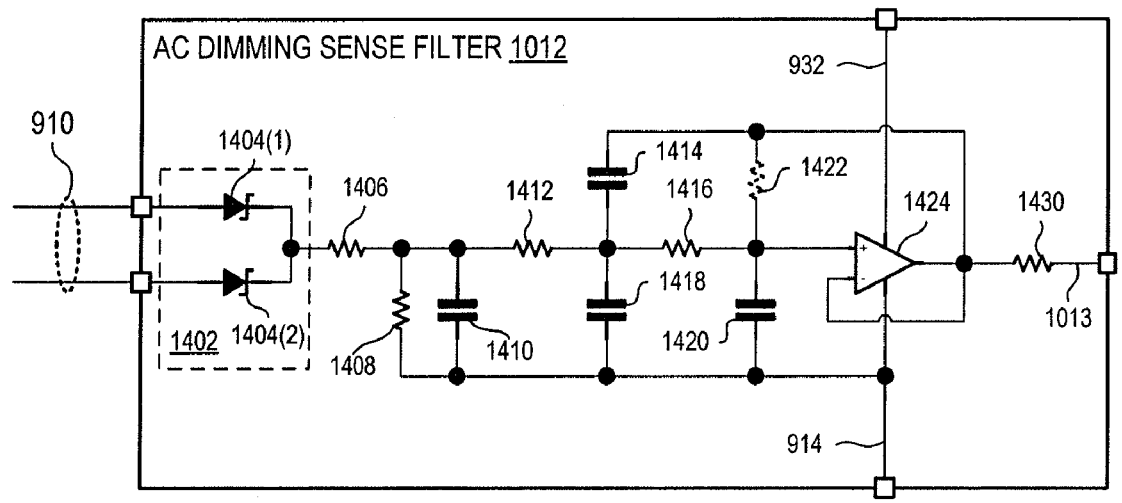
FIG. 14 shows the AC dimming sense filter if FIG. 10 in exemplary detail.

FIG. 14 shows AC dimming sense filter 1012 in exemplary detail. AC power 910 is rectified by diodes 1401(1) and 1404(2) that form a full wave rectifier 1402. Resistors 1406, 1408, 1412, 1416, 1430, capacitors 1410, 1414, 1418, 1420, and amplifier 1424, connected as shown in FIG. 14, cooperate to filter a rectified waveform from rectifier 1402 to produce dimming indication signal 1013. As described above, dimming indication signal 1013 has a DC component that is indicative of the AC dimming level applied to AC power 910 (e.g., as applied by AC dimmer 922, FIG. 9). Resistor 1422 is optional and may be omitted. Capacitor 1418 is optional and may be omitted.

In one embodiment, diodes 1401 are for example DFLS1100. Resistors 1406, 1408, 1412, 1416, and 1430, may have values 294K, 42.2K, 107K, 25.5K, and 10K, respectively. Capacitors 1410, 1414, and 1420, may have values 0.1 µF, 0.47 µF, and 0.22 µF, respectively. Amplifier 1424 is for example an LM258D. Values for optional resistor 1422 and optional capacitor 1418 are selected based upon desired filtering characteristics of AC dimming sense filter 1012.

Figure 15:
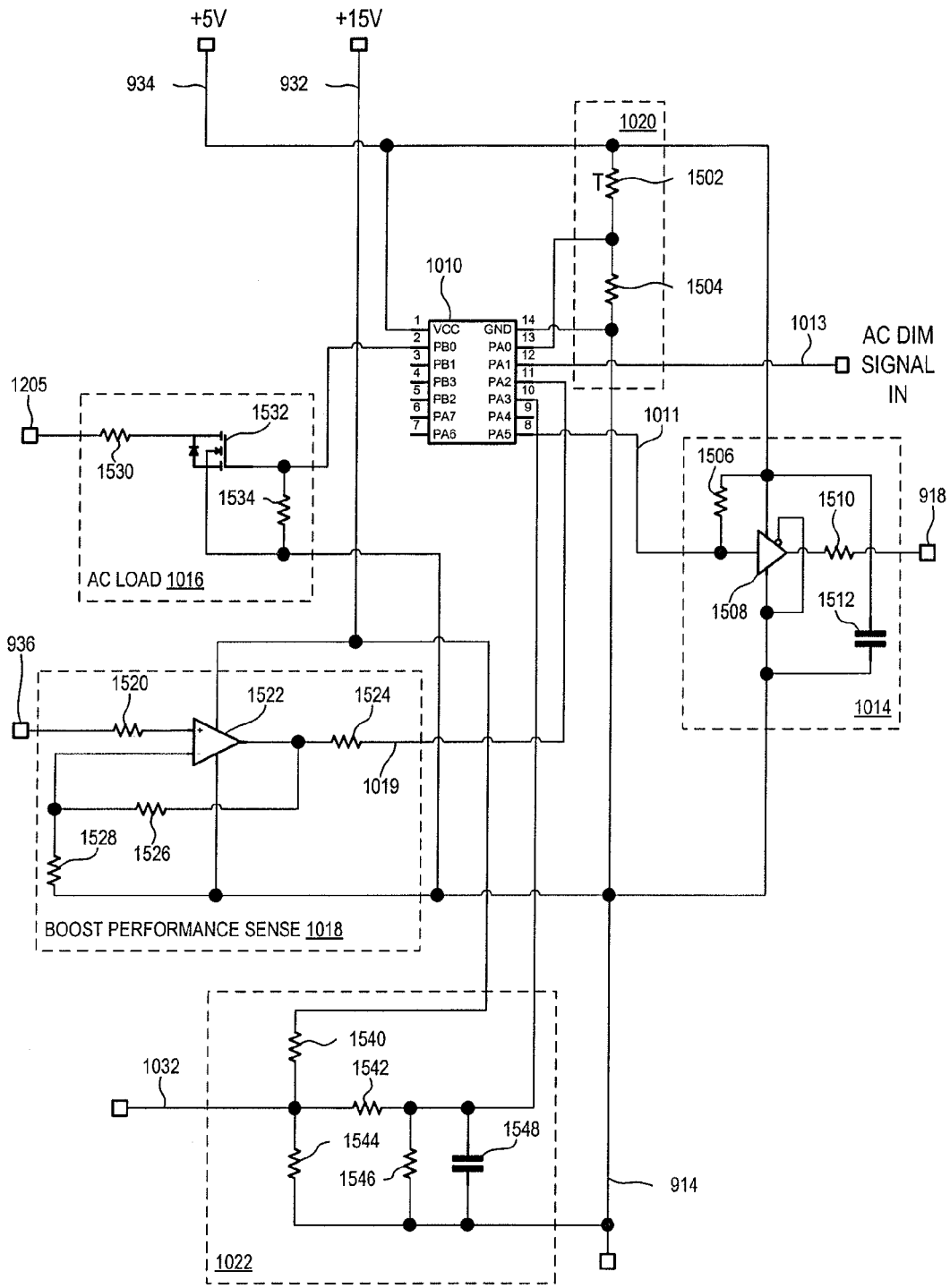
FIG. 15 shows exemplary connectivity of the microcontroller and circuits of FIG. 10.

FIG. 15 shows exemplary connectivity of microcontroller 1010, AC load 1016, boost performance sense 1018, 0-10V input circuit 1022, and PWM signal driver 1014, of FIG. 10. Microcontroller 1010 is programmed with machine readable instructions that, when executed within microcontroller 1010, implement one or more algorithms for operating system 900. FIG. 15 shows exemplary detail of PWM signal driver 1014 formed of resistors 1506 and 1510, capacitor 1512, and a driver 1508 that cooperate to generate PWM dimming control signal 918 based upon PWM dimming control signal 1011 from microcontroller 1010. Resistors 1506 and 1510 may have values 10K and 100, respectively. Capacitor 1512 may have a value of 0.1 µF. Microcontroller 1010 is for example a Tiny24 by Atmel. Driver 1958 is for example a 74UHC1G125.

With reference to FIG. 10, FIG. 15 also shows exemplary detail of temperature sensor circuit 1020 that includes a thermistor 1502 and a resistor 1504 connected in series between second operational voltage 934 and ground rail 914. A center connection between thermistor 1502 and resistor 1504 connects to an input (e.g., PA0) of microcontroller 1010, enabling one or more algorithms within microcontroller 1010 to determine temperature of power supply 902. In one embodiment, Thermistor 1502 may have a temperature coefficient of 100K, and resistor 1504 may have a value of 10.0K.

With reference to FIG. 10, FIG. 15 also shows boost performance sense circuit 1018 that converts integrator signal 936 into a range suitable for input to microcontroller 1010. Boost performance sense circuit 1018 includes resistors 1520, 1524, 1526, and 1528, and an amplifier 1522. Boost performance signal 1019 is output from boost performance sense circuit 1018 into microcontroller 1010, wherein one or more algorithms may utilize boost performance information of integration signal 936, at least in part, to control PWM dimming control signal 1011. In one embodiment, resistors 1520, 1524, 1526, and 1528 may have values 51K, 10K, 174K, and 69.8K, respectively, and amplifier 1522 is for example an LM258D.

With reference to FIGS. 9 and 10, FIG. 15 also shows AC load circuit 1016 that is controlled by microcontroller 1010 to impart a load current onto rectified power 1205 to prevent erratic operation of AC dimmer 922 at high dimming levels. AC load circuit 1016 is formed of resistors 1530 and 1534 and a metal oxide semiconductor field-effect transistor (MOSFET) 1532. An output signal from microcontroller 1010 turns on MOSFET 1532 to draw current from rectified power 1205, through resistor 1530 and MOSFET 1532 to ground rail 914, thereby increasing current through AC dimmer 922. In one embodiment, MOSFET 1532 is for example a ZXMN4A06G from Zetex. Resistors 1530 and 1534 may have values 20 and 10K, respectively.

With reference to FIG. 10, FIG. 15 also shows exemplary detail of optional input circuit 1022. Input circuit 1022 is formed with resistors 1540, 1542, 1544, and 1546, and a capacitor 1548, as shown, and operates to bias, attenuate, and filter input signal 1032 for input to microcontroller 1010. In one embodiment, resistors 1540, 1542, 1544, and 1546 may have values 12.4K, 665K, 49.9K, and 332K, respectively, and capacitor 1548 may have a value of 0.1 µF.

Figure 16:
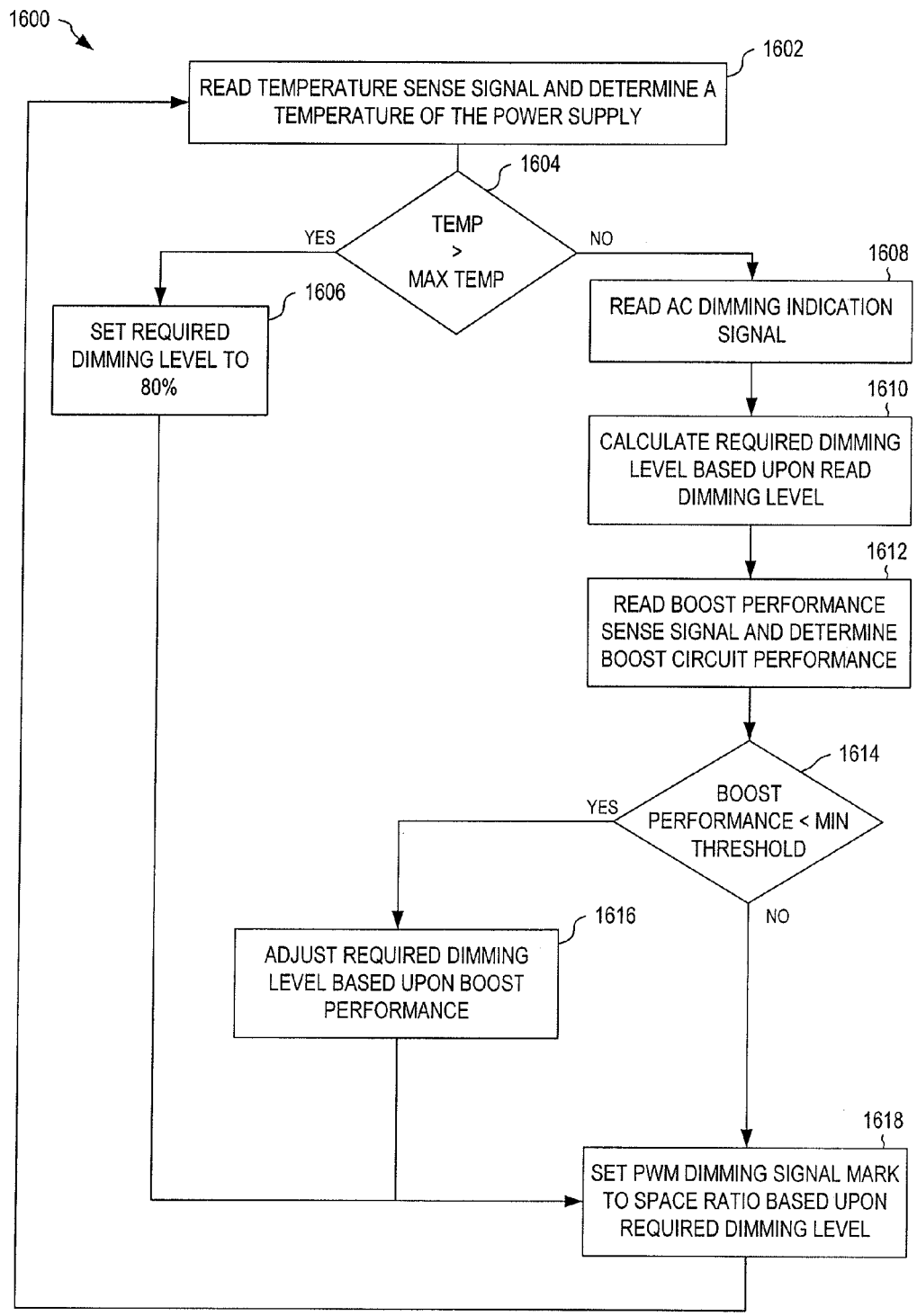
FIG. 16 is a flowchart illustrating one exemplary method, implemented within the microcontroller of FIG. 10, for controlling the PWM dimming signal, in an embodiment.

FIG. 16 is a flowchart illustrating one exemplary method 1600 implemented within microcontroller 1010 of FIG. 10, for example as an algorithm for controlling PWM dimming signal 918. In step 1602, a temperature sense signal is read and a temperature of the power supply is determined. In one example of step 1602, microcontroller 1010 reads a temperature value from temperature circuit 1020 and determines a current temperature of power supply 902. Step 1604 is a decision. If in step 1604, the temperature determined in step 1602 is greater than a maximum operational temperature of power supply 902, method 1600 continues with step 1606; otherwise, method 1600 continues with step 1608. In step 1606, a required dimming level is set to 80%. In one example of step 1606, microcontroller 1010 sets an internal memory location to a value representative of 80% dimming level. Method 1600 then proceeds with step 1618.

In step 1608, the AC dimming indication signal is read. In one example of step 1608, microcontroller 1010 samples and converts AC dimming signal 1013 into a digital value. In step 1610, a required dimming level is calculated based upon the digital value of step 1608. In one example of step 1610, microcontroller 1010 utilizes a formula for converting the digital value generated in step 1608 into a value representative of the required dimming level. In step 1612, a boost performance sense signal is read and boost circuit performance is determined. In one example of step 1612, microcontroller 1010 samples and converts the output 1019 of boost performance sense circuit 1018 into a digital value and utilizes a formula for calculating a performance factor of boost circuit 1004. Step 1614 is a decision. If, in step 1614, boost performance is below a minimum threshold, method 1600 continues with step 1616; otherwise, method 1600 continues with step 1618.

In step 1616, the required dimming level of step 1610 is adjusted based upon the determined boost circuit performance of step 1612. In one example of step 1616, microcontroller 1010 increases the required dimming level if the determined boost performance indicated that the dimming level is being reduced too quickly. In step 1618, the PWM dimming signal mark to space ratio is set based upon the required dimming level. In one example of step 1618, microcontroller 1010 configures an internal PWM signal generator to generate a PWM signal for input to PWM driver circuit 1506.

Steps 1602 through 1618 repeat continuously to set dimming level of lighting fixtures 904 based upon determined AC dimming level of AC power 910. Ordering of steps within method 1600 may change without departing from the scope hereof. For example, step 1608 may be performed prior to conditional step 1604.

Considering FIG. 9 makes it clear that implementing power and control functions by power supply 902 in bus 911 to serve any number of lighting fixtures 904, enables modular LED light fixture configurations and manufacturing flexibility that are advantageous to both manufacturers and users of LED-based lighting products. For example, power supply 902 may be regarded as a power supply subsystem that can supply power and control to one or many lighting fixtures 904. Lighting fixtures 904 may vary greatly in shape, size, light output and spectral properties (e.g., as determined by selection of LEDs 1324, FIG. 13) while remaining compatible with power supply 902. In certain embodiments, bus 911 may be implemented in the form of one or more connectorized cables connecting power supply 904 and lighting fixtures 904 manufactured as physically discrete subsystems. In certain other embodiments, power supplies 902 and lighting fixtures 904 may be physically integrated into single finished products, but the manufacturing thereof may be staged independently (e.g., power supply subsystems may be built independently of lighting fixtures and the two may be integrated later at a final assembly stage).

To a consumer, this means that lighting system 900 may be manufactured, sold and installed modularly. That is, the consumer can purchase and install one power supply 902, a number, type and position of lighting fixtures 904, and appropriate cabling to implement bus 911, for the consumer's desired application. Lighting fixtures 904 can be swapped in and out for other lighting fixtures 904, for example to modify power or spectral properties of the installation to suit changing needs or to replace a lighting fixture 904 that does not operate correctly.

To a manufacturer, this means that power supplies 902 may be mass manufactured, possibly ahead of specific orders and at low cost, while lighting fixtures 904 can be manufactured more to order, to meet individual demands for fixtures of specific shapes, sizes, light outputs and spectral properties. Furthermore, lighting fixtures 904 can be partially manufactured up to the point where they are populated with LEDs, so that when a customer order is placed and the LEDs for the order are stocked, the LEDs can be added to lighting fixtures 904. This is similar to typical current practice wherein nearly finished LED-based lighting products can be staged without LEDs, except that when the lighting fixtures and power supply subsystems are manufactured separately, the inventory of power supply subsystems need not be "tied up," that is, committed to specific lighting products, until after the LEDs are added to lighting fixtures.

Figure 17:
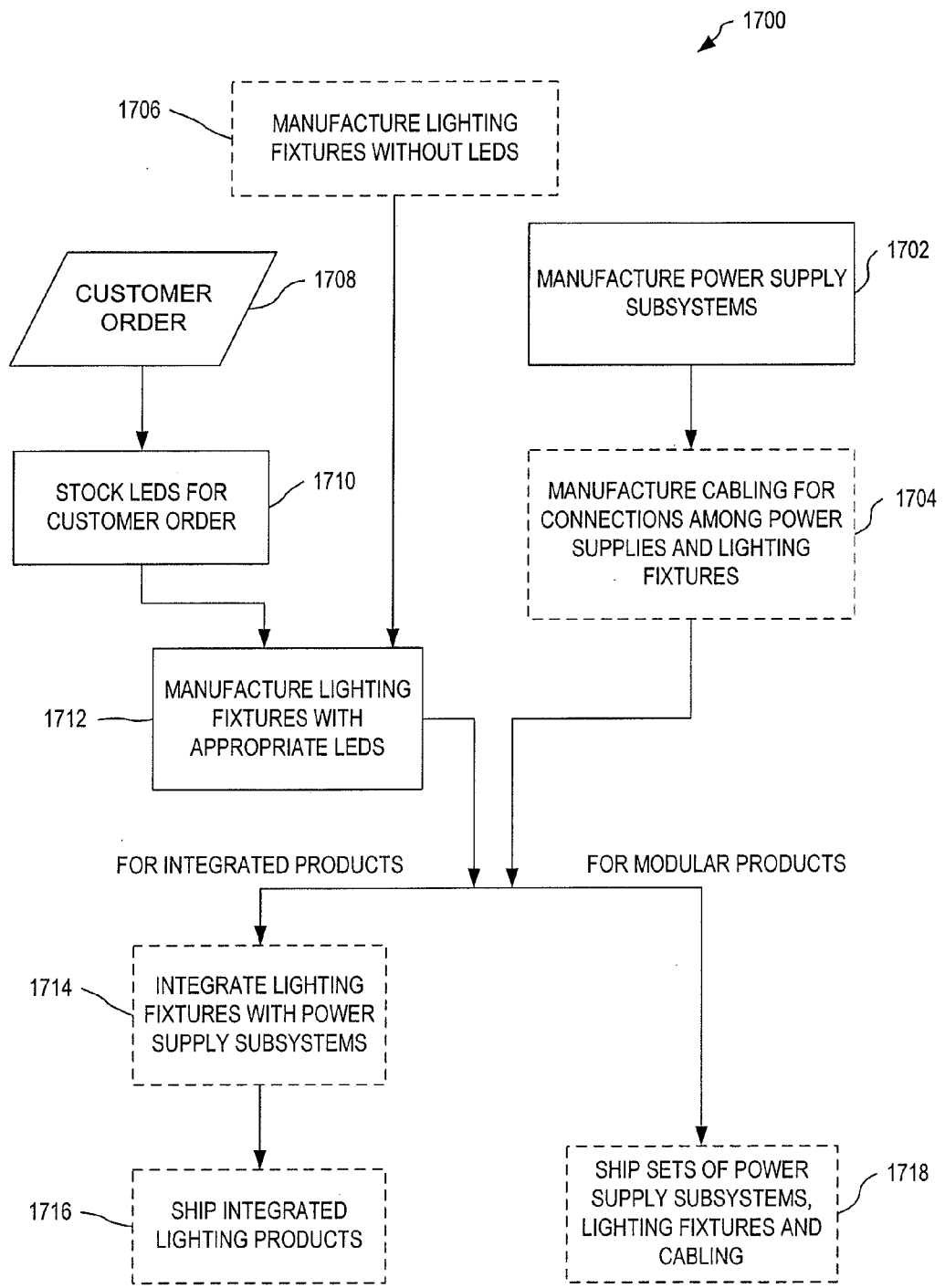
FIG. 17 is a flowchart illustrating one exemplary method of manufacturing LED-based lighting products, in an embodiment.

FIG. 17 is a flowchart of a method 1700 of manufacturing LED-based lighting products. A first step 1702 manufactures power supply subsystems. An example of step 1702 is manufacturing power supply 902 (see FIG. 9 for examples of items referred to throughout FIG. 17). An optional step 1704 manufactures cabling for connecting among power supply subsystems and lighting fixtures. An example of step 1704 is manufacturing cabling that implements bus 911.

Separately from steps 1702 and 1704, an optional step 1706 manufactures lighting fixtures without populating the fixtures with LEDs. An example of step 1706 is manufacturing lighting fixtures 904 without populating the LEDs on the fixtures. Other components of the lighting fixtures (e.g., components such as controller 1302, capacitors 1314 and 1316, diodes 1312 and 1320, transistor 1308, inductor 1322 and resistors 1304, 1306 and 1308, see FIG. 13) may be added to the boards in step 1706, or may be added when the LEDs are later attached in step 1712, below. It is contemplated that steps 1702, 1704, 1706 and 1712, below, may be performed in the same manufacturing facility or in different manufacturing facilities, as preferred by the manufacturer to take advantage of opportunities to reduce cost and/or utilize manufacturing resources. In particular, it may be advantageous for a manufacturer to perform steps 1702 1704 and/or 1706 at a low cost, high volume manufacturing facility (due to the relative stability of the designs) but perform step 1712 at another facility that can adapt to the inventory management challenges of tracking LED batches, and/or batches of lighting fixtures with the LEDs physically committed to them (e.g., by soldering the LEDs to the fixtures).

A customer order 1708 triggers a step 1710 of stocking LEDs for lighting products to fill the customer order. One example of step 1710 is identifying a set of LEDs 1324 that are already in the lighting product manufacturer's inventory, to add to lighting fixtures 904 (see FIG. 13). Another example of step 1710 is ordering the LEDs and awaiting their arrival. Step 1712 manufactures lighting fixtures with the appropriate LEDs stocked in step 1710. As noted above, an example of step 1712 is building lighting fixtures 904 from the component level; another example is simply adding LEDs stocked in step 1710 to lighting fixtures that were manufactured without LEDs in step 1706.

After steps 1702, 1712 and optional step 1704, and when modular systems are being built, method 1700 proceeds to step 1718 where sets of power supply subsystems, lighting fixtures and cabling are shipped. An end user can then assemble the power supply subsystems and the lighting fixtures, using the cabling, to form LED-based lighting products. Furthermore, it is contemplated that the modular nature of lighting products described herein will lead to cases where a manufacturer may sometimes manufacture and deliver power supply subsystems, lighting fixtures and/or cabling as independent products. An example of step 1718 is shipping sets that include one or more power supplies 902, lighting fixtures 904 and cabling that implements bus 911. When an integrated lighting product is being built, method 1700 instead proceeds to step 1714 that integrates the lighting fixtures with the power supply subsystems. An example of step 1714 is integrating one or more lighting fixtures 904 with a power supply 902. A step 1716 ships the integrated lighting products manufactured in step 1714.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A power supply for powering a load, comprising:
   a boost circuit with power factor correction (PFC) that derives an operating voltage from an electrical power source;
   a current control circuit that controls a current supplied by the operating voltage through the load; and
   a voltage control circuit that generates a feedback voltage supplied to the boost circuit to control the operating voltage, wherein the feedback voltage is substantially equal to the sum of (a) a voltage required across the load to drive the current through the load, (b) half of a maximum peak-to-peak voltage of a ripple on the operating voltage, and (c) a minimum voltage drop across the current control circuit;
   wherein the current control circuit operates to control the current through the load, with minimal heat loss from the current control circuit and without ripple on the current.

2. The power supply of claim 1, the current control circuit comprising:
   a sense resistor, connected in series with the load, that generates a first voltage representative of the current through the load;
   a current sink transistor, connected in series with the load and the sense resistor, that controls the current through the load such that the first voltage is substantially equal to a second voltage representative of a desired current through the load.

3. The power supply of claim 2, the second voltage being predetermined and fixed.

4. The power supply of claim 2, the minimum voltage drop across the current control circuit being the voltage drop across the sense resistor plus a voltage drop across the current sink transistor.

5. The power supply of claim 2, the current control circuit further comprising a current control input responsive to a current control signal such that the current control circuit controls the current through the load based upon the current control signal.

6. The power supply of claim 5,
   the current control signal being a pulse width modulated (PWM) control signal that modifies the second voltage between substantially zero and a predefined maximum voltage,
   the current control circuit modifying the current through the load based upon the second voltage, and
   the voltage control circuit varying the feedback voltage based upon a sensed voltage drop across the load, such that the boost circuit modifies the operating voltage based upon the feedback voltage.

7. The power supply of claim 5, the current through the load being substantially continuous.

8. The power supply of claim 1, the current control circuit allowing the boost circuit to attain the operating voltage upon start-up of the power supply with the load connected.

9. The power supply of claim 1, the operating voltage being substantially 2.5V greater than a voltage drop across the load.

10. The power supply of claim 1, the load comprising one or more light emitting diodes.

11. The power supply of claim 1, the power supply substantially attaining the current through the load within 100 mS of application of power from the electrical power source.

12. The power supply of claim 1, wherein size of one or more capacitors of the boost circuit is reduced based upon the maximum peak-to-peak voltage of the ripple on the operating voltage in comparison to the size of capacitors used in boost circuits with less ripple.

13. A method for driving a load using a boost circuit with power factor correction (PFC), a current control circuit, and a voltage feedback circuit, comprising:
   receiving electrical power at the boost circuit;
   generating an operating voltage, from the electrical power and based upon a voltage feedback signal, within the boost circuit;
   controlling a current through the load using a current sink of the current control circuit that is connected in series with the load, the current sink being controlled based upon a difference between (a) a first voltage across a sense resistor of the current control circuit connected in series with the load, and (b) a reference voltage representative of a desired current through the load; and
   generating the voltage feedback signal based upon a second voltage sensed at the current sink such that the operating voltage is substantially equal to the sum of (a) a voltage drop produced across the load by the current through the load, (b) half of a maximum peak-to-peak voltage of a ripple on the operating voltage, and (c) a minimum voltage drop across the current control circuit;
   wherein current through the load is substantially continuous.

14. The method of claim 13, wherein the current through the load is controlled without effect from ripple on the operating voltage.

15. The method of claim 14, wherein allowing the ripple on the operating voltage allows capacitor size within the boost circuit to be reduced, as compared to a capacitor size required for an equivalent boost circuit having substantially no ripple.

16. The method of claim 13, further comprising:
   controlling the reference voltage based upon an input current control signal indicative of a desired current through the load, and
   repeating the steps of receiving, controlling, and generating such that the current through the load is substantially equal to the desired current through the load and the power loss is minimized.

* * * * *